(12) United States Patent
Nakamoto et al.

(10) Patent No.: US 9,988,089 B2
(45) Date of Patent: Jun. 5, 2018

(54) VEHICLE BODY FRONT STRUCTURE

(71) Applicant: HONDA MOTOR CO., LTD., Minato-Ku, Tokyo (JP)

(72) Inventors: Naoki Nakamoto, Wako (JP); Shinya Kobayashi, Wako (JP); Yuki Matsushima, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 65 days.

(21) Appl. No.: 15/333,424

(22) Filed: Oct. 25, 2016

(65) Prior Publication Data

US 2017/0113727 A1 Apr. 27, 2017

(30) Foreign Application Priority Data

Oct. 26, 2015 (JP) .................. 2015-209656

(51) Int. Cl.
| | | |
|---|---|---|
| B60N 99/00 | (2006.01) | |
| B62D 21/15 | (2006.01) | |
| B62D 25/08 | (2006.01) | |
| B60R 19/34 | (2006.01) | |

(52) U.S. Cl.
CPC ............ B62D 21/152 (2013.01); B60R 19/34 (2013.01); B62D 25/08 (2013.01); B62D 25/082 (2013.01); B60Y 2304/03 (2013.01); B60Y 2304/05 (2013.01)

(58) Field of Classification Search
CPC .... B62D 21/152; B62D 25/08; B62D 25/082; B60R 19/34; B60Y 2304/03; B60Y 2304/05
See application file for complete search history.

(56) References Cited

U.S. PATENT DOCUMENTS

| | | | |
|---|---|---|---|
| 8,789,877 B2 | 7/2014 | Ohnaka et al. | |
| 2010/0127531 A1* | 5/2010 | Yasuhara ............. | B62D 21/152 296/187.09 |
| 2010/0270830 A1* | 10/2010 | Maruyama ............. | B62D 25/02 296/209 |
| 2011/0101735 A1* | 5/2011 | Fujita ................... | B62D 21/152 296/193.06 |

FOREIGN PATENT DOCUMENTS

JP 5537583 B2 7/2014

* cited by examiner

*Primary Examiner* — Lori L Lyjak
(74) *Attorney, Agent, or Firm* — Carrier Blackman & Associates, P.C.; Joseph P. Carrier; William D. Blackman

(57) ABSTRACT

There is provided a vehicle body front structure in which left and right frame side mounting members for connecting the rear ends of left and right bumper beam extensions are provided at the front ends. The left and right front side frames are formed from left and right side inner panels and left and right side outer panels. The left and right side outer panels are formed from left and right rear outer panels and left and right front outer panels. The left and right front outer panels are formed from left and right side plates, left and right upper plates, and left and right lower plates. At least one of the set of the left and right upper plates and the set of the left and right lower plates is formed by members different from the left and right side plates.

12 Claims, 13 Drawing Sheets

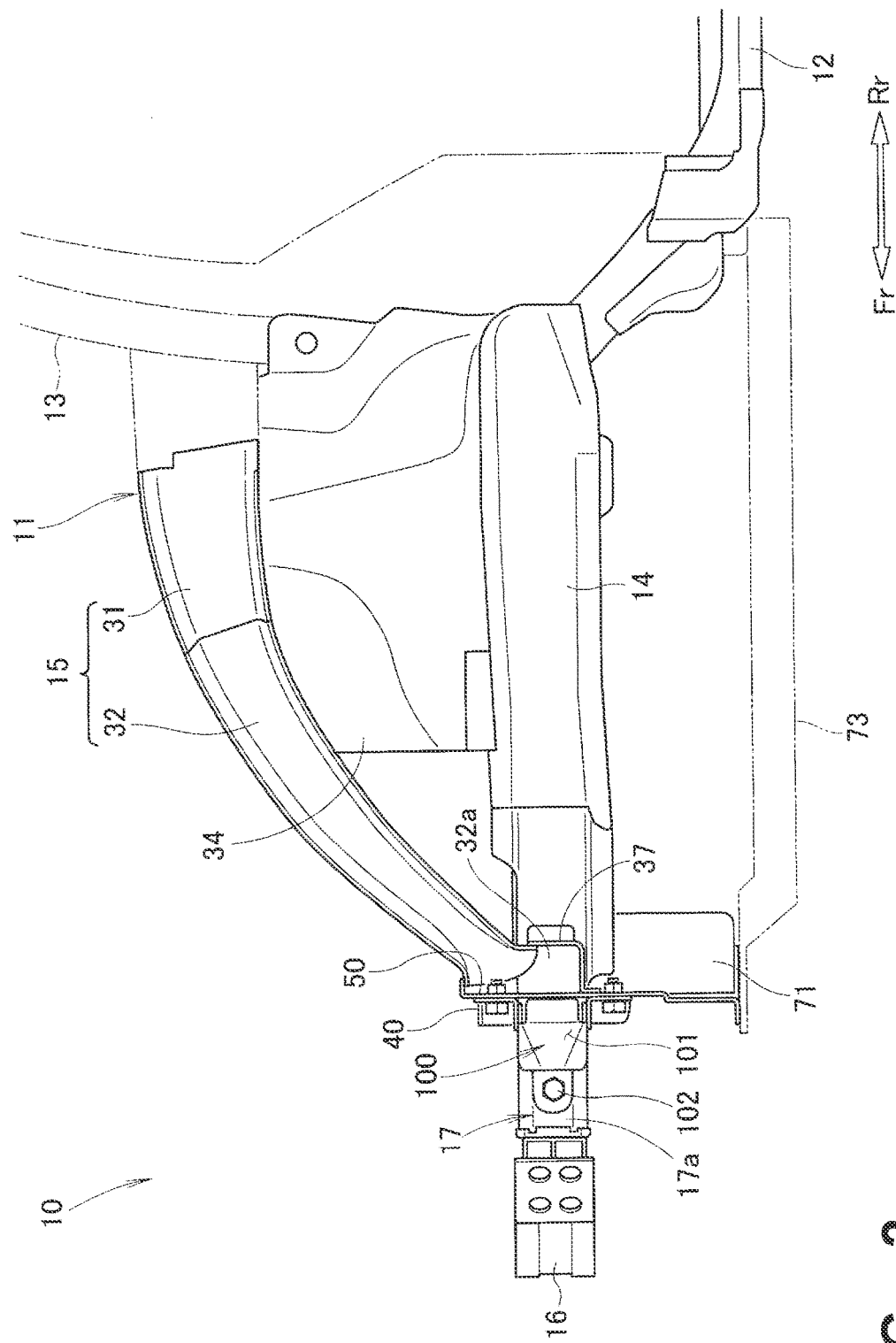
F I G. 2

VEHICLE BODY FRONT STRUCTURE

BACKGROUND OF THE INVENTION

Field of the Invention

The present invention relates to a vehicle body front structure.

Description of the Related Art

In a vehicle such as a passenger car, a front bumper beam extending in the vehicle width direction is located at the front end of a vehicle body. Left and right bumper beam extensions extending to the rear side are provided at two ends of the front bumper beam in the longitudinal direction. The rear ends of the left and right bumper beam extensions are detachably connected to the front ends of left and right front side frames.

In recent years, a technique of absorbing collision energy when a narrow offset collision occurs in the front part of a vehicle body has been developed. This technique is known from, for example, Japanese Patent No. 5537583.

In a known vehicle body front structure disclosed in Japanese Patent No. 5537583, left and right gussets project outward in the vehicle width direction from the front ends of left and right front side frames. Each of the left and right gussets is formed in a triangular shape in a planar view, in which among the three sides, the first side is joined to the outer surface of the corresponding front side frame in the vehicle width direction and the second side faces the front side of the vehicle body.

When a narrow offset collision occurs in the front part of a vehicle body, especially, when a collision occurs at a position outside the left and right front side frames in the vehicle width direction, the gusset can receive a collision load. The collision load is transferred from the gusset to the front side frame. The gusset and front side frame can absorb collision energy.

Since, however, the left and right gussets are provided at the front ends of the left and right front side frames, there is room for improvement from the viewpoint of suppressing the weight of the vehicle body and reducing the cost of the vehicle body.

The present invention provides a technique capable of absorbing the collision energy of a narrow offset collision while suppressing the weight of a vehicle body and reducing the cost of the vehicle body.

SUMMARY OF THE INVENTION

According to the present invention, a vehicle body front structure includes a front bumper beam located at a front end of a vehicle body and extending in a vehicle width direction, left and right bumper beam extensions extending to a rear side from two ends of the front bumper beam in a longitudinal direction, and left and right frame side mounting members provided at front ends of left and right front side frames so as to connect rear ends of the left and right bumper beam extensions to the front ends of the left and right front side frames.

The left and right front side frames are formed from left and right side inner panels on an inside in the vehicle width direction and left and right side outer panels on an outside in the vehicle width direction. The left and right side outer panels are formed from left and right rear outer panels located in rear half portions of the left and right front side frames and left and right front outer panels located in front half portions of the left and right front side frames. The rear half portions of the left and right front side frames are structures having a closed sectional shape and formed from the left and right side inner panels and the left and right rear outer panels. The left and right front outer panels are formed from vertical plate-like left and right side plates, horizontal plate-like left and right upper plates extending in the vehicle width direction from upper ends of the left and right side plates, and horizontal plate-like left and right lower plates extending in the vehicle width direction from lower ends of the left and right side plates. At least one of the set of the left and right upper plates and the set of the left and right lower plates is formed by members different from the left and right side plates. The left and right side plates are configured to extend from front ends of the left and right rear outer panels to a front side while inclining outward in the vehicle width direction, and to be joined to the left and right frame side mounting members.

As described above, the left and right side outer panels are formed from the left and right rear outer panels and the left and right front outer panels. The vertical plate-like left and right side plates of the left and right front outer panels extend from the front ends of the left and right rear outer panels to the front side while inclining outward in the vehicle width direction. The front ends of the left and right side plates are joined to the left and right frame side mounting members provided at the front ends of the left and right front side frames. Thus, the left and right frame side mounting members, the left and right front outer panels, and the left and right side inner panels form left and right gusset structures having a triangular shape in a planar view. The left and right gusset structures project outward in the vehicle width direction from the front ends of the left and right front side frames. When a narrow offset collision occurs in the front part of the vehicle body, the gusset structures can receive a collision load. The collision load is transferred from the gusset structures to the rear half portions of the front side frames. The gusset structures and the front side frames can sufficiently absorb collision energy.

In addition, the left and right frame side mounting members, the front outer panels, and the left and right side inner panels only form the left and right gusset structures. No additional members for absorbing the collision energy of a narrow offset collision are necessary. It is possible to suppress the weight of the vehicle body and reduce the cost of the vehicle body.

Furthermore, the left and right side outer panel are divided into the left and right rear outer panels and the left and right front outer panels. The left and right front outer panels are formed from the left and right side plates, the left and right upper plates, and the left and right lower plates. At least one of the set of the left and right upper plates and the set of the left and right lower plates is formed by members different from the left and right side plates. Consequently, even in an arrangement in which the front ends of the left and right front outer panels are displaced outward in the vehicle width direction with respect to the left and right side inner panels, the processability of the left and right front side frames is high.

For example, if the left and right upper plates and the left and right lower plates are integrally formed with the left and right side plates, the left and right front outer panels are formed by performing drawing of single plates. To the contrary, according to the present invention, at least one of the set of the left and right upper plates and the set of the left and right lower plates is formed by members different from the left and right side plates. Thus, even if a depth for which it is difficult to perform drawing is set, the left and right front outer panels can be readily formed by bending and joining.

The left and right side outer panels include left and right joint portions formed by overlaying and joining the front ends of the left and right rear outer panels and front ends of the left and right front outer panels, and also include left and right fragile portions provided near the left and right joint portions. Thus, the left and right joint portions of the left and right side outer panels have rigidities higher than those of other portions. On the other hand, the left and right fragile portions of the left and right side outer panels have rigidities lower than those of other portions. Rigidity differences between the left and right joint portions and the left and right fragile portions are large. Since there are clear rigidity differences between the portions, the left and right fragile portions of the left and right side outer panels can be reliably bent when a collision (including a full-lap collision in addition to a narrow offset collision) occurs in the front part of the vehicle body. Therefore, the left and right front side frames can absorb the collision energy more reliably.

Furthermore, as described above, the left and right side outer panels include the left and right joint portions with high rigidities. The rigidities of the left and right front side frames are increased. Even if the vibration of wheels on a traveling road surface or a vibration from an engine is transferred to the left and right front side frames, the vibration of the left and right front side frames can be suppressed. Therefore, the NV performance (noise and vibration performance) of the overall vehicle can be improved.

Interiors of the left and right front side frames are respectively partitioned into front portions and rear portions by left and right bulkheads provided between the left and right side inner panels and the left and right rear outer panels. Thus, the rigidities at positions where the left and right bulkheads are held in the left and right front side frames can be increased. In addition, the left and right bulkheads are located behind and near the left and right fragile portions. Therefore, when a collision (including a full-lap collision in addition to a narrow offset collision) occurs in the front part of the vehicle body, the left and right fragile portions of the left and right side outer panels can be reliably bent.

Left and right cover plates for reinforcement are provided on surfaces of the left and right front outer panels, which face the left and right side inner panels. The left and right front outer panels are reinforced by the left and right cover plates, thereby increasing the rigidities. When a narrow offset collision occurs in the front part of the vehicle body, the front outer panels resist bending and deformation, and also resist crushing in the longitudinal direction. Thus, it is possible to transfer a collision load from the front outer panels to the rear half portions of the front side frames more reliably and efficiently. The rear half portions of the front side frames can absorb collision energy more sufficiently.

The left and right upper plates extend inward in the vehicle width direction from the upper ends of the left and right side plates. The left and right lower plates extend inward in the vehicle width direction from the lower ends of the left and right side plates. The left and right cover plates are provided at at least one of a set of corners between the left and right side plates and the left and right upper plates and a set of corners between the left and right side plates and the left and right lower plates. Originally, the corner portions (ridge portions of the left and right front outer panels in the longitudinal direction) of the left and right front outer panels have rigidities higher than those of other portions, and it is thus easy to transfer the collision load in the longitudinal direction of the left and right front outer panels. That is, much of the collision load is readily transferred. The high rigidities of the corner portions can be further increased by the small left and right cover plates.

The left and right side plates include left and right beads, formed on plate surfaces, for the side plates. The left and right beads for the side plates are long in a front-and-rear direction of the vehicle body. Thus, it is possible to suppress the left and right side plates from bending and deforming in the plate surface directions. That is, the rigidities of the left and right side plates can be increased. Therefore, when a narrow offset collision occurs in the front part of the vehicle body, it is easy to transfer much of a collision load from the side plates to the rear half portions of the front side frames. The rear half portions of the front side frames can sufficiently absorb collision energy.

The left and right upper plates include left and right beads, formed on plate surfaces, for the upper plates. The left and right beads for the upper plates are long in extension directions of the left and right side plates. Thus, it is possible to suppress the left and right upper plates from bending and deforming in the plate surface directions. That is, the rigidities of the left and right upper plates can be increased. Therefore, when a narrow offset collision occurs in the front part of the vehicle body, it is easy to transfer much of a collision load from the upper plates to the rear half portions of the front side frames. The rear half portions of the front side frames can sufficiently absorb collision energy.

The vehicle body front structure further includes left and right subframe mounting brackets extending downward from the front ends of the left and right front side frames and configured to attach a front end of a subframe to lower ends. The left and right subframe mounting brackets have a substantially U-shaped sectional shape open to the front side when viewed from above. Open ends of the left and right subframe mounting brackets on the front side are configured to be closed by the left and right frame side mounting members and to be joined to the left and right frame side mounting members. Side plates of the left and right subframe mounting brackets on the outside in the vehicle width direction exist between side surfaces of the left and right side inner panels on the outside in the vehicle width direction and side surfaces of the left and right front outer panels on the inside in the vehicle width direction, and extend to upper ends of the left and right side inner panels.

As described above, the left and right subframe mounting brackets with an almost U-shaped section are configured to have a closed section by sealing the open ends by the left and right frame side mounting members. The left and right frame side mounting members are provided at the front ends of the left and right front side frames. Thus, it is possible to increase the rigidities of the left and right subframe mounting brackets.

Furthermore, as described above, the side plates of the left and right subframe mounting brackets on the outside in the vehicle width direction are sandwiched between the side surfaces of the left and right side inner panels on the outside in the vehicle width direction and the side surfaces of the left and right front outer panels on the inside in the vehicle width direction, and extend to the upper ends of the left and right side inner panels. Thus, it is possible to increase the rigidities of the upper proximal ends of the left and right subframe mounting brackets.

When the vibration of wheels on a traveling road surface or a vibration from an engine is transferred from the subframe to the left and right side inner panels and the left and right front outer panels via the left and right subframe mounting brackets, it is possible to distribute vibration energy. Therefore, the NV performance of the overall vehicle can be improved.

The vehicle body front structure further includes left and right front upper members located outside the left and right front side frames in the vehicle width direction and extending in a front lower direction from left and right front pillars, and left and right side connecting members configured to connect front lower ends of the left and right front upper members to the front ends of the left and right front outer panels. The left and right frame side mounting members extend outside positions of the left and right bumper beam extensions in the vehicle width direction. The left and right side connecting members are configured to be jointed to the left and right frame side mounting members.

As described above, the front lower ends of the left and right front upper members are connected to the front ends of the left and right front outer panels by the left and right side connecting members and the left and right frame side mounting members. Therefore, when a narrow offset collision occurs in the front part of the vehicle body, the front lower ends of the front upper members are pulled toward the front ends of the front outer panels, thereby implementing bending deformation. Thus, the front upper members and the front lower ends of the front upper members can absorb collision energy, thereby increasing the energy absorption amount. When a full-lap collision occurs in the front part of the vehicle body, a collision load can be distributed to the left and right front side frames and the left and right front upper members. Collision energy can be sufficiently absorbed by distributing it to the front side frames and the front upper members.

The left and right frame side mounting members include left and right rear extension portions extending to the rear side from upper ends of the left and right frame side mounting members on the outside in the vehicle width direction. The left and right rear extension portions are configured to be joined to upper surfaces of the front lower ends of the left and right front upper members. Therefore, the joining rigidities of the left and right frame side mounting members in the vertical direction of the vehicle body with respect to the front lower ends of the left and right front upper members can be increased by the left and right rear extension portions.

When a narrow offset collision occurs in the front part of the vehicle body, the front bumper beam is pulled toward the collision side. At this time, the collision point of the narrow offset collision is not always at the height center of the front bumper beam. If the collision point is offset in the vertical direction from the height center of the front bumper beam, a phenomenon in which the front bumper beam is twisted in the vertical direction may occur. An excessive load in the vertical direction of the vehicle body may act on the joint portions of the frame side mounting members to the front lower ends of the front upper members located on the opposite side of the collision point.

To the contrary, the left and right rear extension portions are joined to the upper surfaces of the front lower ends of the left and right front upper members, and it is thus possible to sufficiently increase the joining rigidities of the left and right frame side mounting members in the vertical direction of the vehicle body with respect to the front lower ends of the left and right front upper members.

When the vehicle body is viewed from above, front ends of the left and right side plates are located on straight lines in the front-and-rear direction which pass through outer surfaces of the left and right bumper beam extensions in the vehicle width direction. Thus, when a narrow offset collision occurs in the front part of the vehicle body, the amount of collision load transferred from the bumper beam extensions to the front outer panels can be increased. Therefore, the front side frames can sufficiently absorb collision energy.

The left and right upper plates include, in edge portions on the outside in the vehicle width direction, left and right three-dimensional portions undulated in plate surface directions. The left and right three-dimensional portions are continuously undulated along the edge portions. Therefore, there are intermittent gaps along the left and right three-dimensional portions between the upper ends of the left and right side plates and the lower surfaces of the left and right upper plates. In the coating process of the vehicle body, an electrodeposition liquid can be permeated from the gaps to spaces between the left and right side inner panels and the left and right side outer panels. As a result, rust prevention treatment of the vehicle body can be performed more satisfactorily.

According to the present invention, it is possible to absorb the collision energy of a narrow offset collision when the narrow offset collision occurs in the front part of a vehicle body while suppressing the weight of the vehicle body and reducing the cost of the vehicle body.

Further features of the present invention will become apparent from the following description of exemplary embodiments (with reference to the attached drawings).

BRIEF DESCRIPTION OF THE DRAWINGS

FIG. 2 is a left side view showing the front part of the vehicle body shown in FIG. 1;

DESCRIPTION OF THE EMBODIMENTS

An embodiment of the present invention will be described below with reference to the accompanying drawings.

A vehicle body front structure according to the embodiment will be described with reference to the accompanying drawings. Note that "front", "rear", "left", "right", "upper", and "lower" represent directions viewed from a driver, and Fr, Rr, Le, and Ri indicate the front, rear, left, and right sides, respectively.

Figure 1:
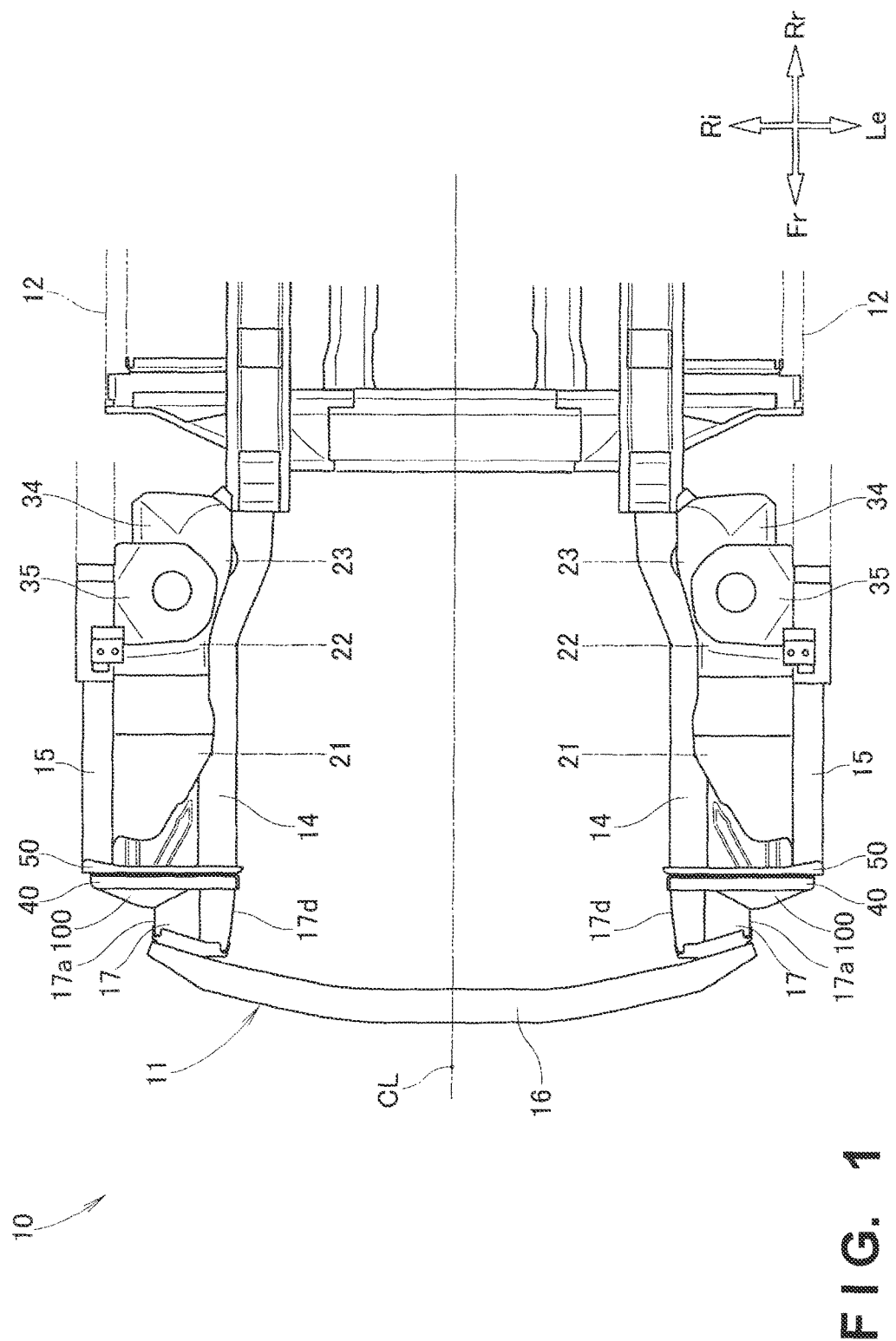
FIG. 1 is a plan view showing the front part of a vehicle body according to the present invention.

As shown in FIG. 1, a vehicle 10 such as a passenger car includes a frameless vehicle body 11. The vehicle body 11 is substantially formed to be bilaterally symmetric with respect to a vehicle width center line CL passing through the center of the vehicle 10 in the vehicle width direction and extending in the front-and-rear direction of the vehicle.

As shown in FIGS. 1 and 2, the front part of the vehicle body 11 includes left and right side sills 12, left and right front pillars 13 (only the left front pillar 13 is shown), left and right front side frames 14, left and right front upper members 15, and a front bumper beam 16.

The left and right side sills 12 are located on both sides, in the vehicle width direction, of the central portion in the front-and-rear direction of the vehicle body, and extend in the front-and-rear direction of the vehicle body. The left and right front pillars 13 extend upward from the front ends of the left and right side sills 12.

The left and right front side frames 14 are located on both sides of the front part of the vehicle body in the vehicle width direction, and extend in the front-and-rear direction of the vehicle body. That is, the left and right front side frames 14 are located on the inner front sides of the left and right side sills 12 in the vehicle width direction, and extend in the front-and-rear direction of the vehicle body.

Figure 3:
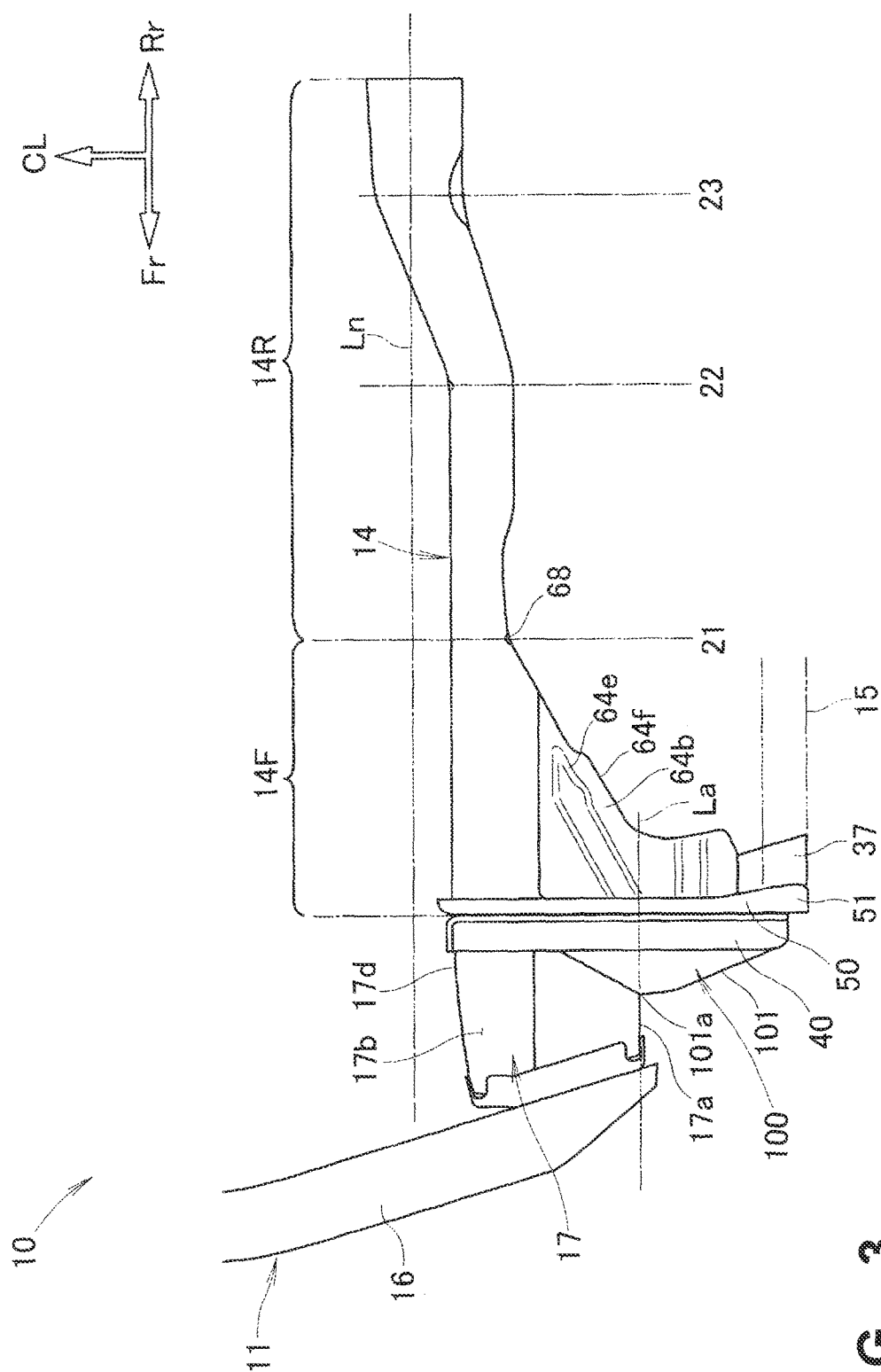
FIG. 3 is a plan view showing the left half of the front part of the vehicle body shown in FIG. 1.

With reference to FIG. 3 as well, each of the left and right front side frames 14 includes at least three bent portions, that is, a left or right front bent portion 21, a left or right intermediate bent portion 22 located behind the left or right front bent portion 21 to be spaced apart from it, and a left or right rear bent portion 23 located behind the left or right intermediate bent portion 22 to be spaced apart from it.

The left and right side frames 14 bend toward the vehicle width center side from the left and right intermediate bent portions 22 to the left and right rear bent portions 23. Thus, the left and right rear bent portions 23 are located inside the left and right front bent portions 21 and the left and right intermediate bent portions 22 in the vehicle width direction.

The left and right front bent portions 21 are portions for absorbing collision energy by bending to project inward in the vehicle width direction by a collision load acting on the front end of the vehicle body 11 from the front direction. The left and right rear bent portions 23 are energy absorbing portions capable of absorbing collision energy by bending outward in the vehicle width direction by the collision load. The left and right intermediate bent portion 22 are bending auxiliary portions which can bend outward in the vehicle width direction to allow the left and right front bent portions 21 and the left and right rear bent portions 23 to bend.

Thus, in each of the left and right front side frames 14, the three bent portions of the left or right front bent portion 21, the left or right intermediate bent portion 22, and the left or right rear bent portion 23 can bend and deform by the collision load transferred from the front bumper beam 16 via a left or right bumper beam extension 17. When these three bent portions bend, the absorption amount of the collision energy can be increased.

As shown in FIGS. 1 and 2, the left and right front upper members 15 are located outside the left and right front side frames 14 in the vehicle width direction, and curve and extend in the front lower direction from the left and right front pillars 13. Left and right wheel houses 34 and left and right front damper housings 35 are bridged and joined between the left and right front side frames 14 and the left and right front upper members 15.

The left and right front upper members 15 include left and right upper members 31 and left and right lower members 32. The left and right upper members 31 are located on the outer upper sides of the left and right front side frames 14 in the vehicle width direction, and extend from the left and right front pillars 13 to the front side.

The left front upper member 15 will be described in detail. The right front upper member 15 has the same arrangement except that it has a bilaterally symmetrical shape with respect to the left front upper member 15. The reference numerals denote the same components and a description thereof will be omitted.

Figure 4:
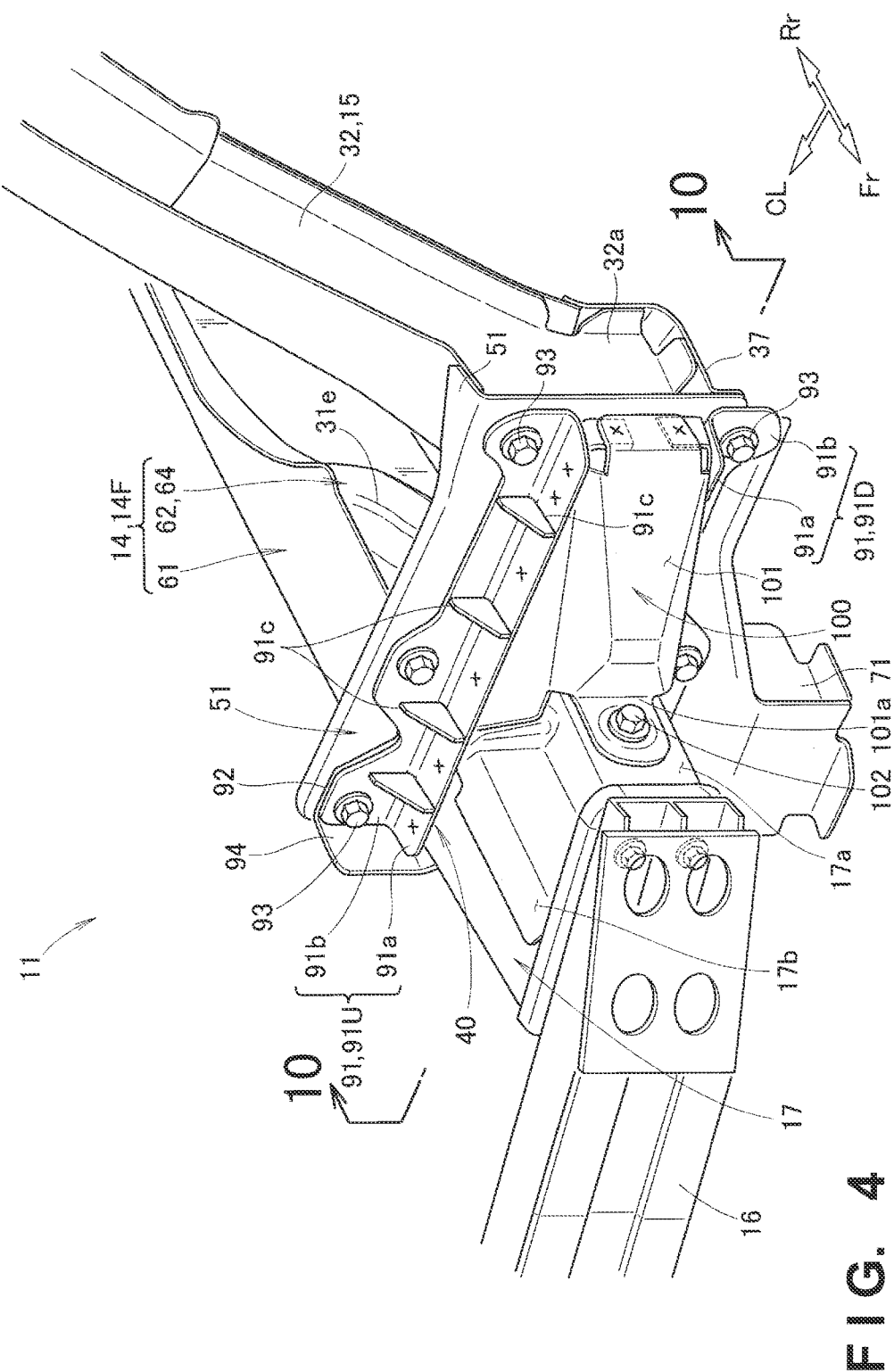
FIG. 4 is a perspective view showing the left portion of the front part of the vehicle body shown in FIG. 3 when viewed from the front upper direction.

With reference to FIG. 4 as well, the left lower member 32 curves and extends in the front lower direction from the front end of the left upper member 31, and further extends almost vertically downward. When the vehicle body 11 is viewed from the vehicle width direction, a front lower end 32a of the left lower member 32 is located near the front end of the left front side frame 14.

Note that the left front upper member 15 may have an arrangement in which the left upper member 31 and the left lower member 32 are integrally formed. The front lower end 32a of the left lower member 32 will be referred to as "the front lower end 32a of the left front upper member 15" hereinafter, as needed.

Figure 5:
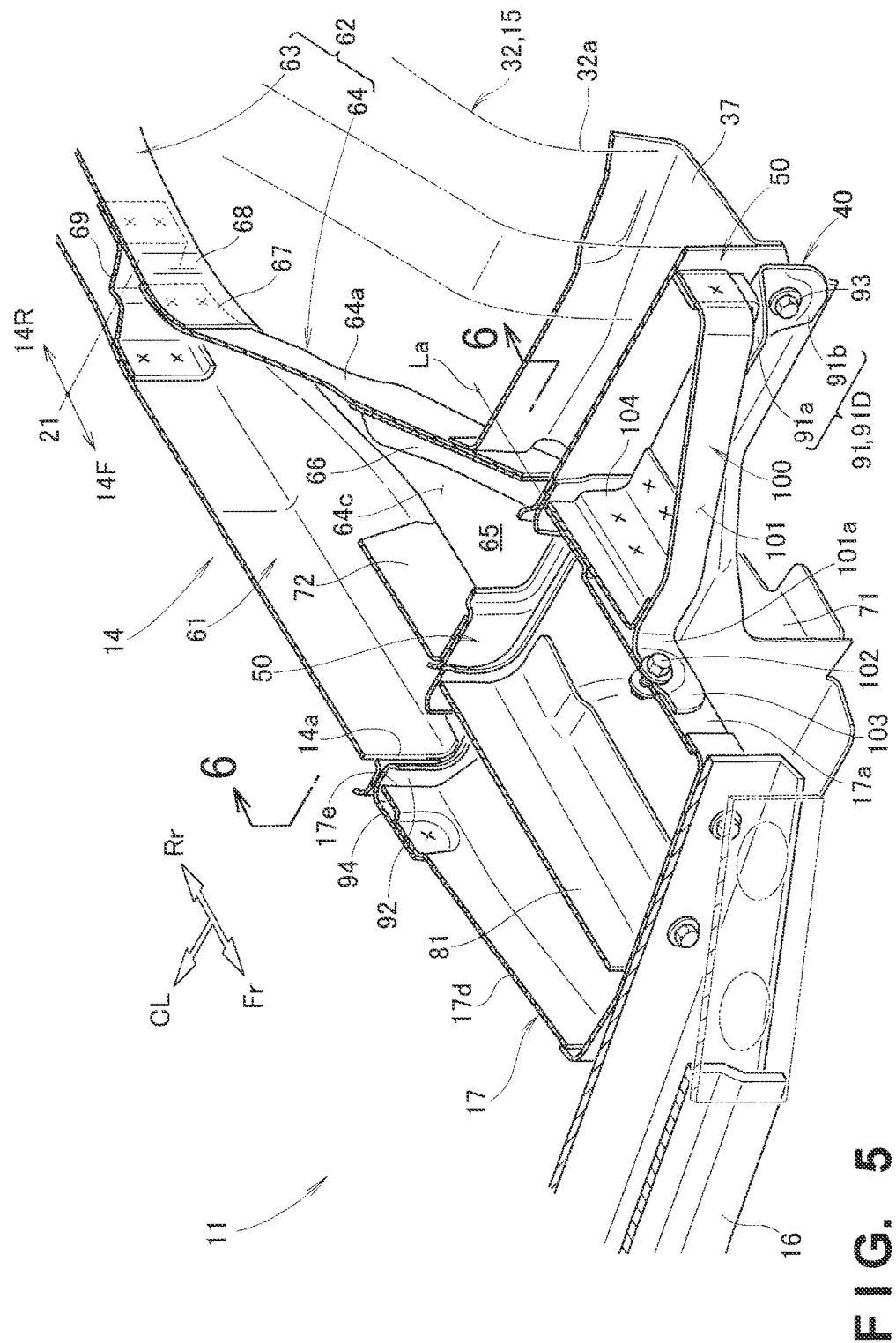
FIG. 5 is a sectional perspective view showing the left portion of the front part of the vehicle body shown in FIG. 4 when viewed from the front upper direction.

With reference to FIG. 5 as well, the front lower end 32a of the left front upper member 15 is connected to the left front side frames 14 by a left side connecting member 37. That is, the left side connecting member 37 connects the front lower end 32a of the left front upper member 15 to the front end of the left front side frame 14.

The front bumper beam 16 will be described next. As shown in FIG. 1, the front bumper beam 16 is located at the front end of the vehicle body 11 to extend in the vehicle width direction, and is provided at the front ends of the left and right front side frames 14 by the left and right bumper beam extensions 17. More specifically, the front bumper beam 16 curves so that the vehicle width central portion has a convex shape toward the front side when the vehicle body 11 is viewed from above. Furthermore, the two ends of the front surface of the front bumper beam 16 incline toward the rear side of the vehicle body while extending outward in the vehicle width direction.

The left and right bumper beam extensions 17 extend to the rear side from the two ends of the front bumper beam 16 in the longitudinal direction. The left and right bumper beam extensions 17 are members that deform due to a collision load at the time of occurrence of a collision in the front part of the vehicle body 11 to absorb some of the collision energy and transfer the collision load from the front bumper beam 16 to the left and right front side frames 14.

As shown in FIGS. 1 and 4, left and right extension side mounting members 40 are provided at the rear ends of the left and right bumper beam extensions 17. On the other hand, left and right frame side mounting members 50 are provided at the front ends of the left and right front side frames 14. Thus, the rear ends of the left and right extension side mounting members 40 can be connected to the front ends of the left and right front side frames 14, that is, the left and right frame side mounting members 50 by a plurality of bolts 93 (see FIG. 4). By removing the plurality of bolts 93, the left and right bumper beam extension side mounting members 40 can be detached from the left and right frame side mounting members 50.

The left and right front side frames 14 will be simply referred to as the "left and right side frames 14" hereinafter, as needed. The front bumper beam 16 will be simply referred to as the "bumper beam 16" hereinafter, as needed. The left and right bumper beam extensions 17 will be simply referred to as the "extensions 17" hereinafter, as needed.

Next, the left side frame 14 will be described in detail. The right side frame 14 has the same arrangement except that it has a bilaterally symmetric shape with respect to the left side frame 14. The same reference numerals denote the same components and a description thereof will be omitted.

As shown in FIGS. 3 and 5, the left side frame 14 includes a left side inner panel 61 on the inside in the vehicle width direction and a left side outer panel 62 on the outside in the vehicle width direction. The left side outer panel 62 includes a left rear outer panel 63 located in a rear half portion 14R of the left side frame 14 and a left front outer panel 64 located in a front half portion 14F of the left side frame 14.

The front end of the left side inner panel 61 and that of the left front outer panel 64 are joined to the rear surface of the left frame side mounting member 50. The left frame side mounting member 50 is a substantially vertical plate-like member, and extends outward in the vehicle width direction to the front of the front lower end 32a of the left front upper member 15 while entirely sealing the front end of the left side frame 14.

Figure 6:
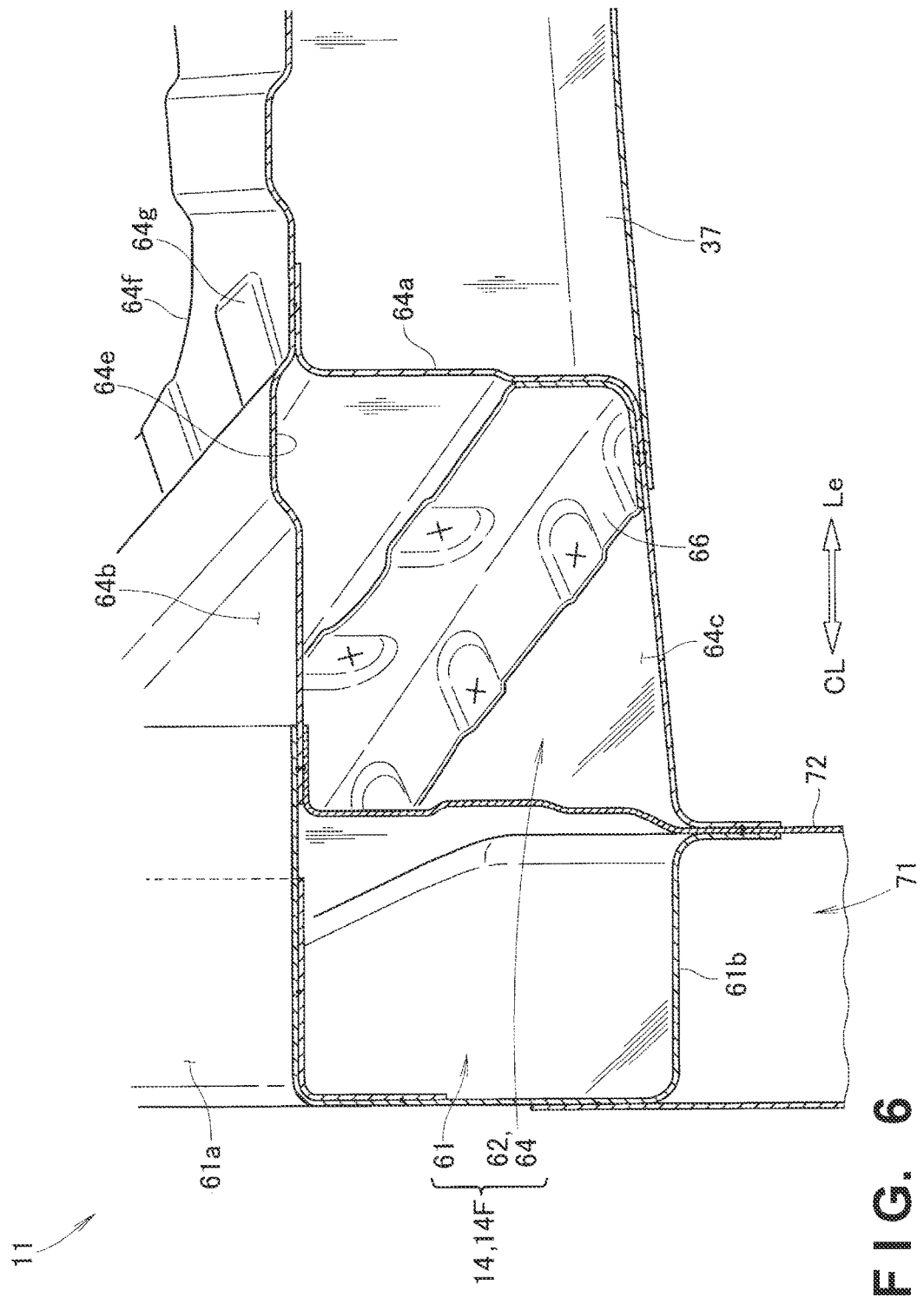
FIG. 6 is a sectional perspective view taken along a line 6-6 in FIG. 5.
Figure 7:
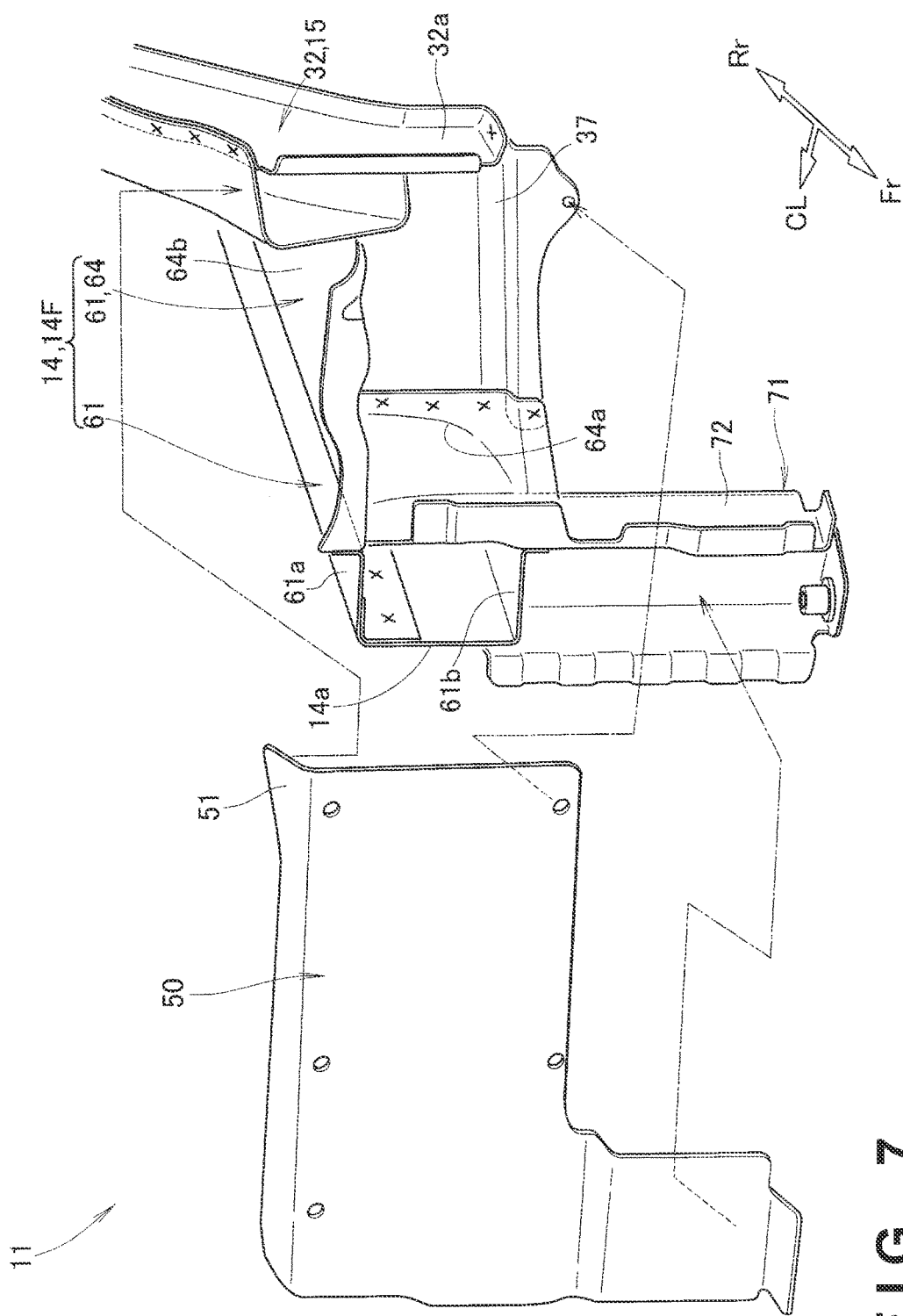
FIG. 7 is an exploded view showing an arrangement in which a left frame side mounting member is removed from the front part of a left front side frame shown in FIG. 4.

As shown in FIGS. 5 to 7, the left side inner panel 61 is formed to have an almost U-shaped section open to the outside in the vehicle width direction in a front view. The left rear outer panel 63 is formed to have an almost U-shaped section open to the inside in the vehicle width direction in a front view. The rear half portion 14R of the left side frame 14 is a structure with a rectangular closed sectional shape including the left side inner panel 61 and the left rear outer panel 63.

The left front outer panel 64 includes a vertical plate-like left side plate 64a, a horizontal plate-like left upper plate 64b extending in the vehicle width direction from the upper end of the left side plate 64a, and a horizontal plate-like left lower plate 64c extending in the vehicle width direction from the lower end of the left side plate 64a.

At least one of the left upper plate 64b and the left lower plate 64c is formed by a member different from the left side plate 64a. For example, the left upper plate 64b is formed by a member different from the left side plate 64a. The left lower plate 64c is integrally formed with the left side plate 64a. Note that the left lower plate 64c may be formed by a member different from the left side plate 64a or both the left upper plate 64b and the left lower plate 64c may be formed by different members. These different members are joined to the left side plate 64a by welding such as spot welding.

The left side plate 64a is configured to extend from the front end of the left rear outer panel 63 to the front side while inclining outward in the vehicle width direction, and to be joined to the left frame side mounting member 50. As a result, the left frame side mounting member 50, the left side inner panel 61, and the left front outer panel 64 form a left gusset structure 65 having a rectangular shape in a planar view. The left gusset structure 65 projects outward in the vehicle width direction from the front end of the left side frame 14.

As described above, at least one of the left upper plate 64b and the left lower plate 64c is formed by a member different from the left side plate 64a. Even in an arrangement in which the front end of the left front outer panel 64 is displaced outward in the vehicle width direction with respect to the left side inner panel 61, the processability of the left side frame 14 is high.

For example, if both the left upper plate 64b and the left lower plate 64c are integrally formed with the left side plate 64a, the left front outer panel 64 is formed by performing drawing of a single plate. To the contrary, in this embodiment, at least one of the left upper plate 64b and the left lower plate 64c is formed by a member different from the left side plate 64a. Thus, even if a depth for which it is difficult to perform drawing is set, the left front outer panel 64 can be readily formed by bending and joining.

More specifically, the left upper plate 64b is configured to extend inward in the vehicle width direction from the upper end of the left side plate 64a, and to be joined to an upper plate 61a of the left side inner panel 61. More particularly, the left upper plate 64b is configured to extend inward and outward in the vehicle width direction with respect to the upper end of the left side plate 64a, and to have an inner end in the vehicle width direction which is joined to the upper plate 61a of the left side inner panel 61 and an outer end in the vehicle width direction which is joined to the left lower member 32. The left lower plate 64c is configured to extend inward in the vehicle width direction from the lower end of the left side plate 64a, and to be joined to a lower plate 61b of the left side inner panel 61.

A left cover plate 66 for reinforcement is provided on a surface of the left front outer panel 64, which faces the left side inner panel 61. The left front outer panel 64 is reinforced by the left cover plate 66, thereby increasing the rigidity. Therefore, when a narrow offset collision occurs on the left side of the front part of the vehicle body 11, the front outer panel 64 resists bending and deformation, and also resists crushing in the longitudinal direction. Thus, it is possible to transfer a collision load from the front outer panel 64 to the rear half portion 14R of the left side frame 14 more reliably and efficiently. The rear half portion 14R of the left side frame 14 can absorb collision energy more sufficiently.

The left cover plate 66 is provided at at least one of the corner between the left side plate 64a and the left upper plate 64b and the corner between the left side plate 64a and the left lower plate. For example, the left cover plate 66 is a member which is jointed to the corner between the left side plate 64a and the left lower plate and has an almost L-shaped section. The left cover plate 66 preferably extends from the front end of the front outer panel 64 to a position near the rear end of the front outer panel 64.

Originally, the corner portion (the ridge portion of the left front outer panel 64 in the longitudinal direction) of the left front outer panel 64 has rigidity higher than those of other portions, and it is thus easy to transfer the collision load in the longitudinal direction of the left front outer panel 64. That is, much of the collision load is readily transferred. The high rigidity of the corner portion can be further increased by the small left cover plate 66.

As shown in FIG. 5, the left side outer panel 62 includes a "left joint portion 67" formed by overlaying and joining the front end of the left rear outer panel 63 and that of the left front outer panel 64, and a "left fragile portion 68" provided near the left joint portion 67. The left fragile portion 68 forms the left front bent portion 21.

The left joint portion 67 of the left side outer panel 62 has rigidity higher than those of other portions. On the other hand, the left fragile portion 68 of the left side outer panel 62 has rigidity lower than those of other portions. The rigidity difference between the left joint portion 67 and the left fragile portion 68 is large. Since there is a clear rigidity difference between the portions 67 and 68, the left fragile portion 68 can be reliably bent when a collision (including a full-lap collision in addition to a narrow offset collision) occurs in the front part of the vehicle body 11. Therefore, the left side frame 14 can absorb the collision energy more reliably.

Furthermore, as described above, the left side outer panel 62 includes the left joint portion 67 with high rigidity. The rigidity of the left side frame 14 is increased. Even if the vibration of wheels on a traveling road surface or a vibration from an engine is transferred to the left side frame 14, the vibration of the left side frame 14 can be suppressed. Therefore, the NV performance (noise and vibration performance) of the overall vehicle 10 can be improved.

As shown in FIG. 5, the interior of the left side frame 14 is partitioned into front and rear portions by a left bulkhead 69 provided between the left side inner panel 61 and the left rear outer panel 63. Thus, the rigidity at a position where the left bulkhead 69 is held in the side frame 14 can be increased.

In addition, the left bulkhead 69 is located behind and near the left fragile portion 68. Thus, when a collision (including a full-lap collision in addition to a narrow offset collision) occurs in the front part of the vehicle body 11, the left fragile portion 68 of the left side outer panel 62 can be reliably bent.

Figure 9:
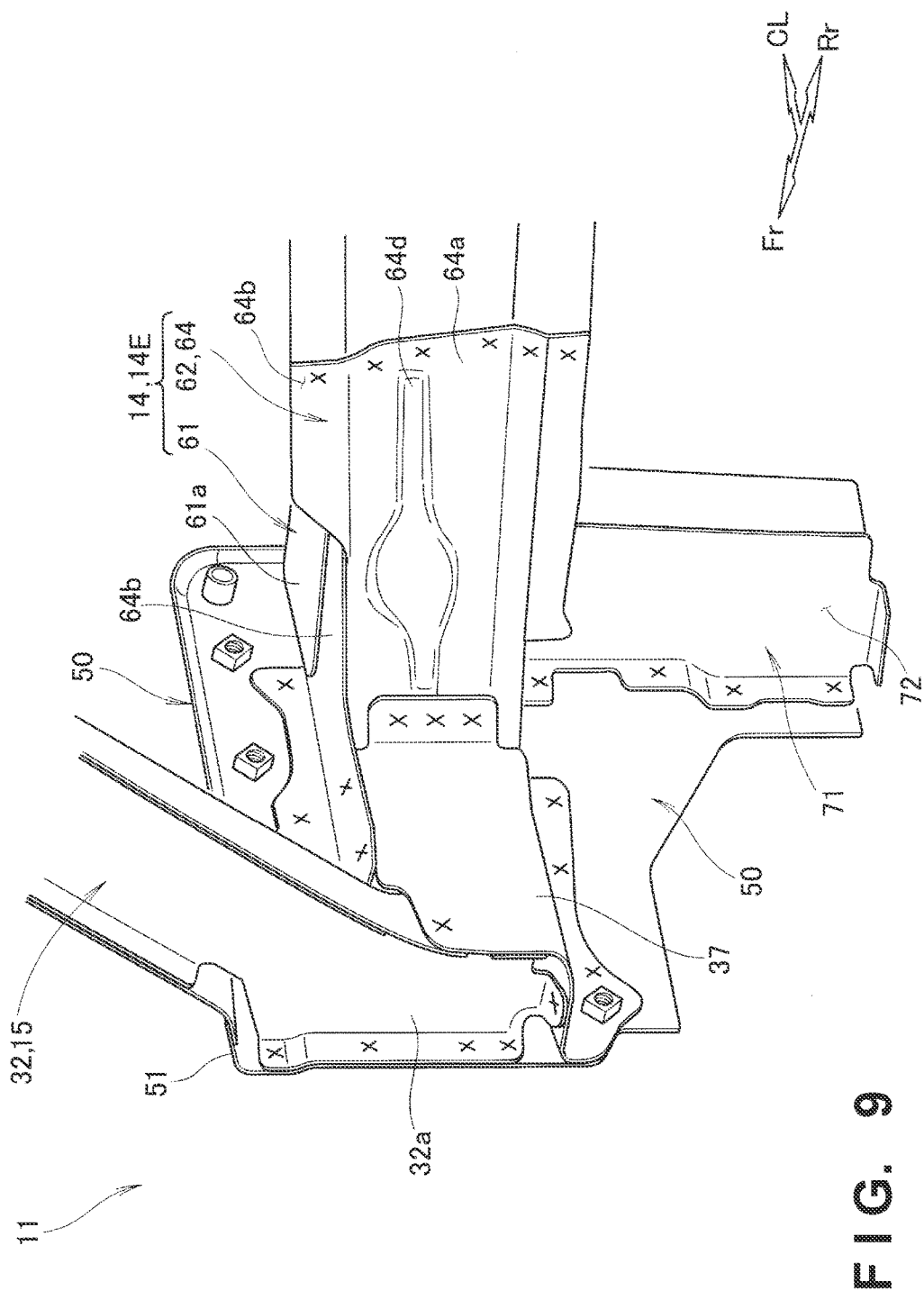
FIG. 9 is a perspective view showing the left portion of the front part of the vehicle body shown in FIG. 4 when viewed from the rear upper direction on the left side in the vehicle width direction.

As shown in FIG. 9, the left side plate 64a of the left front outer panel 64 includes a left bead 64d, formed on a plate surface, for the left side plate 64a. The left bead 64d for the left side plate 64a is long in the front-and-rear direction of the vehicle body along the left side plate 64a. Thus, it is possible to suppress the left side plate 64a from bending and deforming in the plate surface direction. That is, the rigidity of the left side plate 64a can be increased. Therefore, when a narrow offset collision occurs on the left side of the front part of the vehicle body 11, it is easy to transfer much of a collision load from the left side plate 64a to the rear half portion 14R of the left side frame 14. The rear half portion 14R of the left side frame 14 can sufficiently absorb collision energy.

Figure 8:
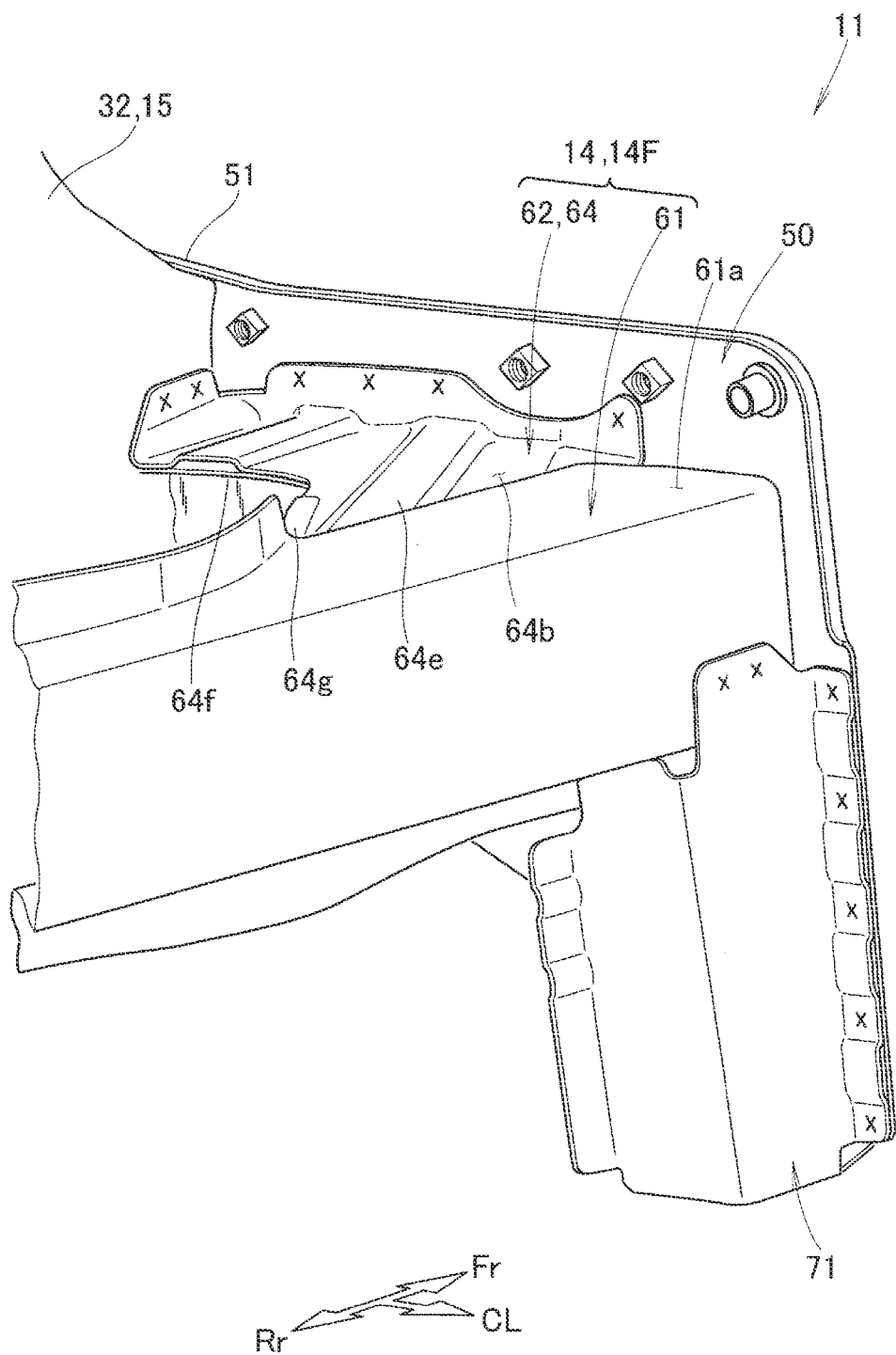
FIG. 8 is a perspective view showing the left portion of the front part of the vehicle body shown in FIG. 4 when viewed from the rear upper direction on the vehicle width center side.

As shown in FIGS. 3, 6, and 8, the left upper plate 64b of the left front outer panel 64 includes a left bead 64e, formed on s plate surface, for the upper plate 64b. The left bead 64e for the upper plate 64b is long in the extending direction of the left side plate 64a. Thus, it is possible to suppress the left upper plate 64b from bending and deforming in the plate surface direction. That is, the rigidity of the left upper plate 64b can be increased. Therefore, when a narrow offset collision occurs on the left side of the front part of the vehicle body 11, it is easy to transfer much of a collision load from the left upper plate 64b to the rear half portion 14R of the left side frame 14. The rear half portion 14R of the left side frame 14 can sufficiently absorb collision energy.

Figure 10:
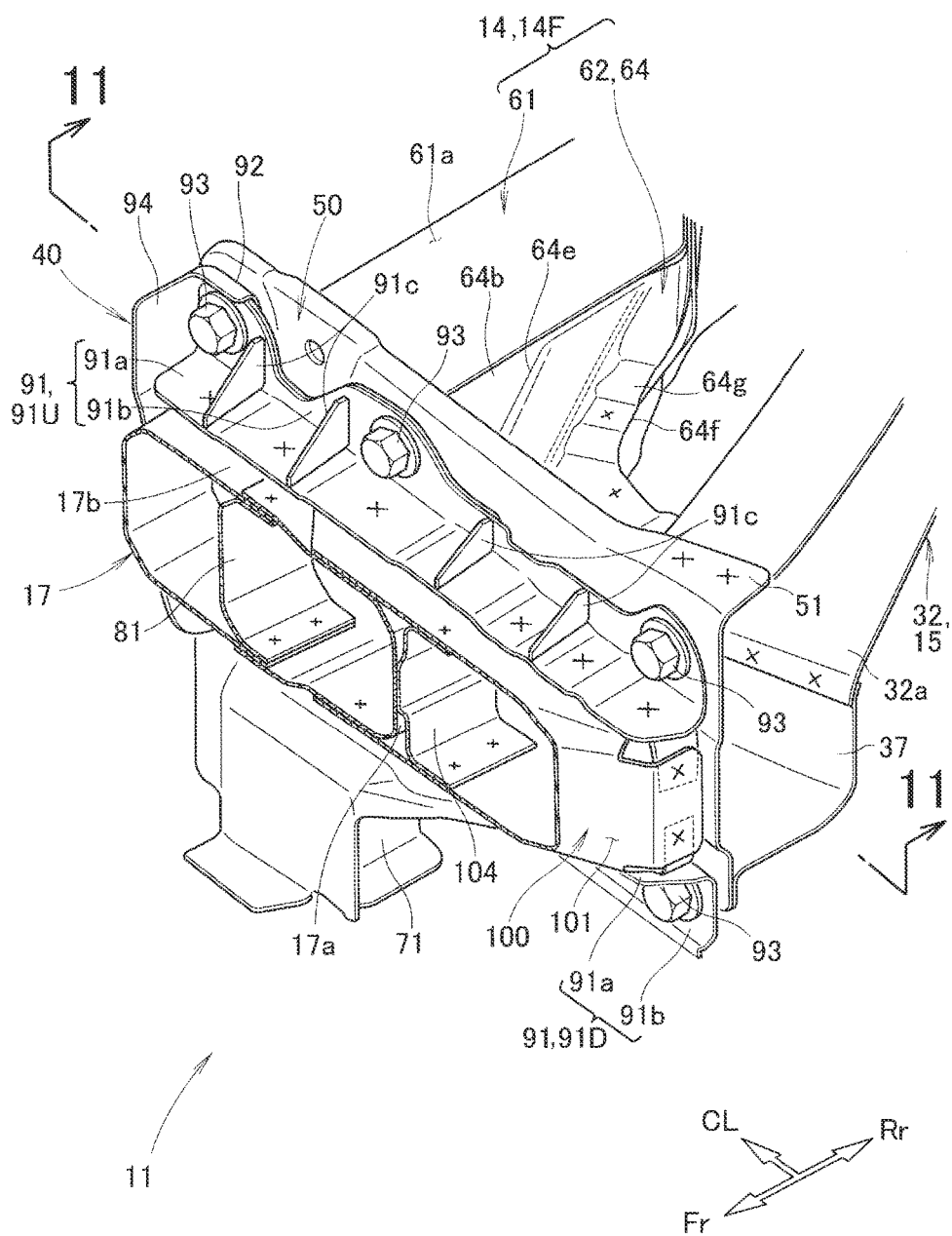
FIG. 10 is a sectional perspective view taken along a line 10-10 in FIG. 4.

Furthermore, as shown in FIGS. 6 and 10, the left upper plate 64b includes, in an edge portion 64f on the outside in the vehicle width direction, a left three-dimensional portion 64g undulated in the plate surface direction. The left three-dimensional portion 64g is continuously undulated along the edge portion 64f. Therefore, there is an intermittent gap along the left three-dimensional portion 64g between the upper end of the left side plate 64a and the lower surface of the left upper plate 64b. In the coating process of the vehicle body, an electrodeposition liquid can be permeated from the gap to a space between the left side inner panel 61 and the left side outer panel 62. As a result, rust prevention treatment of the vehicle body 11 can be performed more satisfactorily.

As shown in FIGS. 2 and 7, the vehicle body 11 includes left and right subframe mounting brackets 71 extending downward from the front ends of the left and right side frames 14. The front end of a subframe 73 can be attached to the lower ends of the left and right subframe mounting brackets 71. The rear end of the subframe 73 can be attached to the lower ends of the rear ends of the left and right side frames 14. A driving unit such as an engine is mounted on the subframe 73. The right subframe mounting bracket (not shown) has a bilaterally symmetrical shape with respect to the left subframe mounting bracket 71 and a description thereof will be omitted.

The left subframe mounting bracket 71 has an almost U-shaped sectional shape open to the front side when viewed from above. The open end of the left subframe mounting bracket 71 on the front side is configured to be closed by the left frame side mounting member 50 and to be joined to the left frame side mounting member 50.

The left subframe mounting bracket 71 with an almost U-shaped section is configured to have a closed section by sealing the open end by the left frame side mounting member 50. As described above, the left frame side mounting member 50 is provided at the front end of the left side frame 14. The rigidity of the left subframe mounting bracket 71 can be increased.

As shown in FIG. 6, a side plate 72 of the left subframe mounting bracket 71 on the outside in the vehicle width direction exists (is sandwiched) and is joined between the side surface of the left side inner panel 61 on the outside in the vehicle width direction and the side surface of the left front outer panel 64 on the inside in the vehicle width direction, and also extends to the upper end of the left side inner panel 61 and is joined.

Thus, it is possible to increase the rigidity of the upper proximal end of the left subframe mounting bracket 71. When the vibration of wheels on a traveling road surface or a vibration from an engine is transferred from the subframe 73 (see FIG. 2) to both the left side inner panel 61 and the left front outer panel 64 via the left subframe mounting bracket 71, it is possible to distribute vibration energy. Therefore, the NV performance of the overall vehicle 10 can be improved.

Next, the left extension 17 will be described in detail. The right extension 17 has the same arrangement except that it has a bilaterally symmetrical shape with respect to the left extension 17. The reference numerals denote the same components and a description thereof will be omitted.

Figure 11:
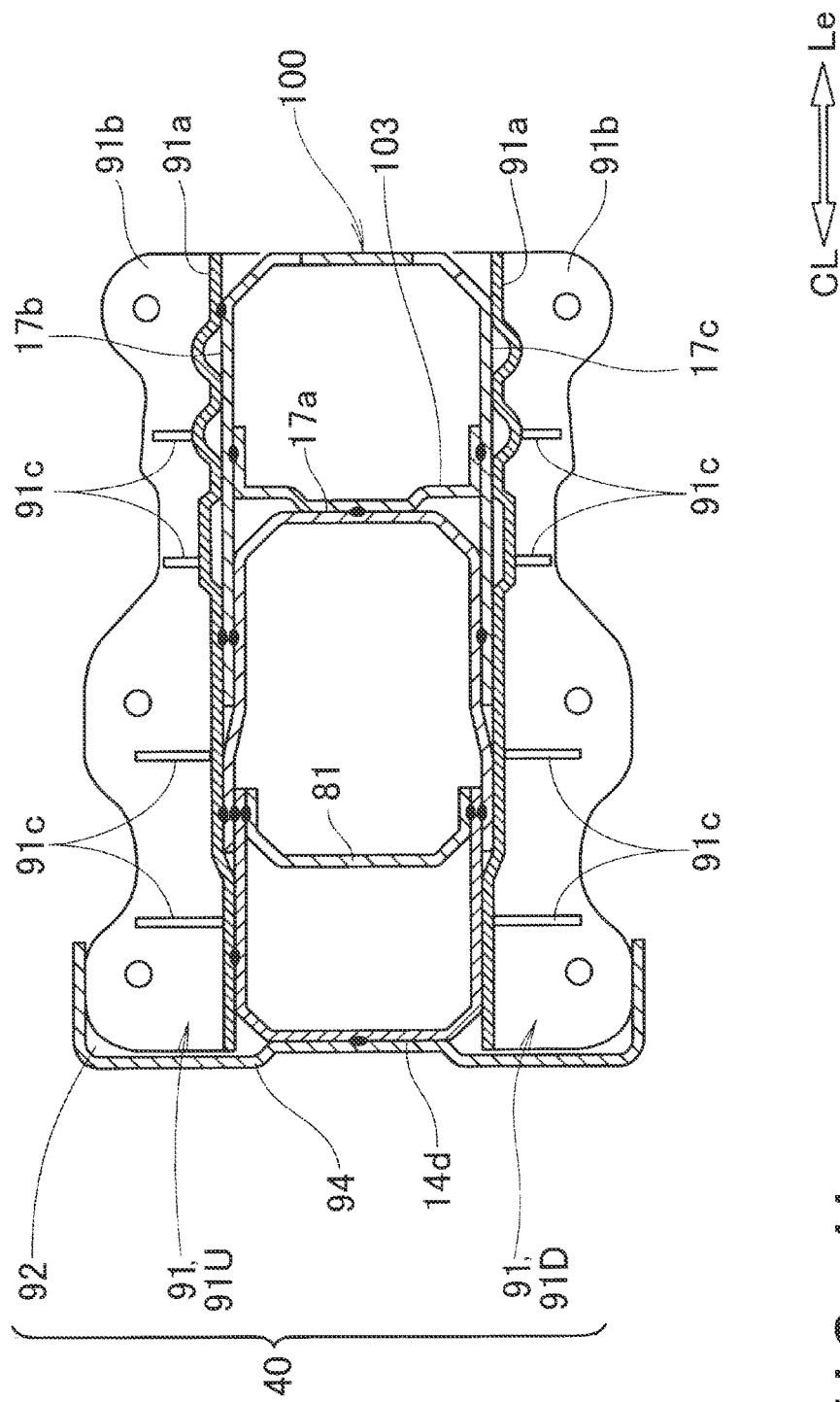
FIG. 11 is a sectional view taken along a line 11-11 in FIG. 10.

As shown in FIGS. 5, 10, and 11, the left extension 17 is configured to have a horizontally long rectangular closed section when the vehicle body 11 is viewed from the front direction and has an almost rectangular shape in a planer view. When the vehicle body 11 is viewed from the front direction, the rear end of the inner surface of the left extension 17 in the vehicle width direction coincides with the inner surface of the left side frame 14 in the vehicle width direction.

On the other hand, when the vehicle body 11 is viewed from the front direction, the rear end of the outer surface of the left extension 17 in the vehicle width direction coincides with the front end of the outer surface of the left side frame 14 in the vehicle width direction. That is, when the vehicle body 11 is viewed from above, the front end of the left side plate 64a of the left front outer panel 64 is located on a straight line La (see FIG. 5) in the front-and-rear direction which passes through an outer surface 17a of the left extension 17 in the vehicle width direction.

Thus, when a narrow offset collision occurs on the left side of the front part of the vehicle body 11, the amount of collision load transferred from the left extension 17 to the front outer panel 64 can be increased. Therefore, the left side frame 14 can sufficiently absorb collision energy.

A left reinforcing member 81 is provided in the left extension 17. The left reinforcing member 81 is a vertical plate-like member extending from the front end of the left extension 17 to its rear end in the front-and-rear direction of the vehicle body. As shown in FIG. 5, the side surface of the left side inner panel 61 on the outside in the vehicle width direction and the side plate 72 of the left subframe mounting bracket 71 on the outside in the vehicle width direction are located immediately behind the left reinforcing member 81. When a narrow offset collision occurs on the left side of the front part of the vehicle body 11, the amount of collision load transferred from the left extension 17 to the front outer panel 64. Therefore, the left side frame 14 can sufficiently absorb collision energy.

As shown in FIGS. 5, 10, and 11, the left extension side mounting member 40 includes at least one left mounting bracket 91 and a left bracket auxiliary portion 92 integrally provided with the left mounting bracket 91.

The left mounting bracket 91 is provided at the rear end of the left extension 17. The left mounting bracket 91 is located on at least one of an upper surface 17b and a lower surface 17c of the left extension 17. More preferably, the left mounting brackets 91 are located on both the upper surface 17b and the lower surface 17c of the left extension 17, respectively.

The upper and lower left mounting brackets 91 will be separately described by referring to the left mounting bracket 91 located on the upper surface 17b of the left extension 17 as a "left upper mounting bracket 91U" and referring to the left mounting bracket 91 located on the lower surface 17c of the left extension 17 as a "left lower mounting bracket 91D", as needed.

The left mounting bracket 91 is formed by an L-shaped member having an almost L-shaped section when viewed from the vehicle width direction, and extends long in the vehicle width direction. The left L-shaped member 91 (left mounting bracket 91) includes a horizontal plate-like left joint plate portion 91a, and a vertical plate-like left flange 91b extending in the vertical direction from the rear end of the left joint plate portion 91a. The left joint plate portion 91a is configured to be joined to the left extension 17 by welding such as spot welding. The left flange 91b is configured to be detachably connected to the front surface of the left frame side mounting member 50 by the plurality of bolts 93.

Thus, at least one of the upper surface 17b and lower surface 17c of the left extension 17 can be supported by the horizontal plate-like joint plate portion 91a of the left L-shaped member 91 (left mounting bracket 91). Therefore, the support rigidity of the left extension 17 by the left side frame 14 can be increased. As a result, the vibration of the bumper beam 16 in the vertical direction can be suppressed, thereby improving the NV performance (noise and vibration performance) of the overall vehicle 10.

In addition, the horizontal plate-like left joint plate portion 91a is joined to at least one of the upper surface 17b and lower surface 17c of the left extension 17. Thus, it is possible to increase the joining strength of the joint portion of the left joint plate portion 91a and the left extension 17, on which stress concentrates.

As shown in FIGS. 10 and 11, a plurality of vertical plate-like ribs 91c are integrally formed at the corner of the left joint plate portion 91a and the left flange 91b. Thus, the corner of the L-shaped left mounting bracket 91 can be reinforced by the ribs 91c. Therefore, the support rigidity of the left extension 17 by the left side frame 14 can be further increased. As a result, the vibration of the bumper beam 16 in the vertical direction can be further suppressed, thereby further improving the NV performance of the overall vehicle 10.

As shown in FIG. 10, at least the left mounting bracket 91 and the left frame side mounting member 50 of the left extension side mounting member 40 extend outside the position of the left extension 17 in the vehicle width direction. The left mounting bracket 91 is configured to be jointed to the front lower end 32a of the left front upper member 15 via the left frame side mounting member 50.

Consequently, when a narrow offset collision occurs on the left side of the bumper beam 16, a collision load can be transferred from the left extension 17 to the front lower end 32a of the left front upper member 15 via the left mounting bracket 91 and the left frame side mounting member 50. Therefore, the left front upper member 15 can also absorb collision energy.

As shown in FIG. 10, the left frame side mounting member 50 includes a left rear extension portion 51 extending to the rear side from the upper end on the outside in the vehicle width direction. The left rear extension portion 51 is configured to be joined to the upper surface of the front lower end 32a of the left front upper member 15. Therefore, the joining rigidity of the left frame side mounting member 50 in the vertical direction of the vehicle body with respect to the front lower end 32a of the left front upper member 15 can be increased by the left and right rear extension portions 51.

When a narrow offset collision occurs on the right side of the front part of the vehicle body 11, the bumper beam 16 is pulled toward the collision side (right side). At this time, the collision point of the narrow offset collision is not always at the height center of the front bumper beam. If the collision point is offset in the vertical direction from the height center of the bumper beam 16, a phenomenon in which the bumper beam 16 is twisted in the vertical direction may occur. Consequently, an excessive load in the vertical direction of the vehicle body may act on the joint portion of the left frame side mounting member 50 to the front lower end 32a of the front upper member 15 located on the opposite side (left side) of the collision point.

To the contrary, the left rear extension portion 51 is joined to the upper surface of the front lower end 32a of the left front upper member 15, and it is thus possible to sufficiently increase the joining rigidity of the left frame side mounting member 50 in the vertical direction of the vehicle body with respect to the front lower end 32a of the left front upper member 15.

As shown in FIGS. 5 and 10, the left side connecting member 37 is configured to be located immediately behind the left frame side mounting member 50, and to be jointed to the rear surface of the left frame side mounting member 50. The left side connecting member 37 is formed to have an almost L-shaped section open to the front and upper sides in a side view, and the open front surface is joined to the rear surface of the left frame side mounting member 50 while the open upper surface is joined to the left upper plate 64b of the left front outer panel 64. As a result, the combined structure of the left side connecting member 37, the left frame side mounting member 50, and the left upper plate 64b of the left front outer panel 64 is formed into a closed sectional shape in a side view.

Thus, when a narrow offset collision occurs in the bumper beam 16, a collision load can be transferred from the left extension 17 to the front lower end 32a of the left front upper member 15 via the left side connecting member 37. Therefore, it is possible to increase the amount of collision load transferred from the left extension 17 to the front lower end 32a of the left front upper member 15. In addition, the left side connecting member 37 and the left frame side mounting member 50 are combined into a closed sectional shape in a side view. Therefore, it is possible to further increase the support rigidity of the left extension 17 by the left side frame 14 and the left front upper member 15. As a result, the vibration of the bumper beam 16 in the vertical direction can be further suppressed, thereby improving the NV performance of the overall vehicle 10.

Figure 12:
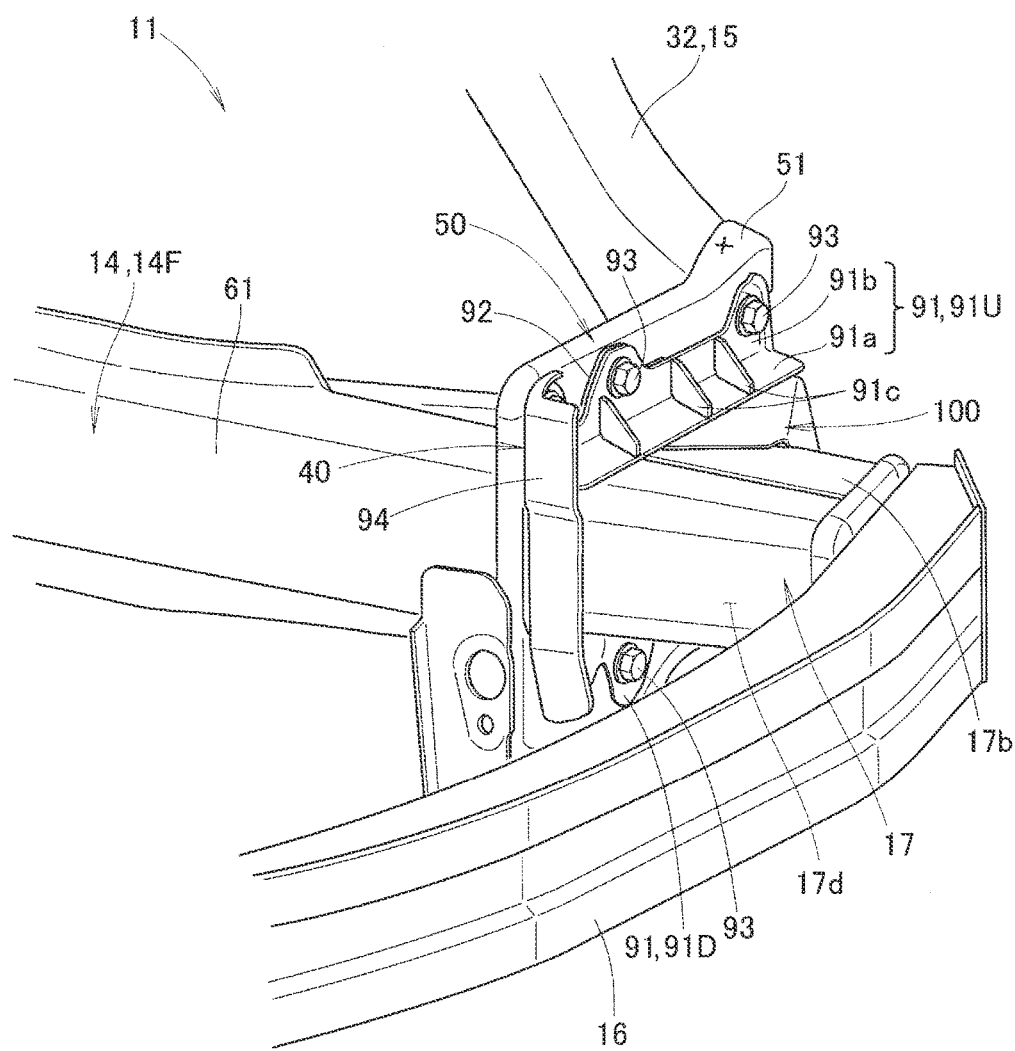
FIG. 12 is a perspective view showing the left portion of the front part of the vehicle body shown in FIG. 4 when viewed from the front upper direction on the vehicle width center side.

As shown in FIGS. 5, 11, and 12, the left bracket auxiliary portion 92 of the left extension side mounting member 40 is configured to be joined to the rear surfaces of the left mounting brackets 91. More specifically, the left bracket auxiliary portion 92 is formed by a vertical plate-like flat plate which is overlaid on the rear surfaces of the left mounting brackets 91 and joined to them. The left bracket auxiliary portion 92 integrally connects the rear surface of the left flange 91b of the left upper mounting bracket 91U and the rear surface of the left flange 91b of the left lower mounting bracket 91D.

Note that the left bracket auxiliary portion 92 is formed over the entire range in the height direction from the upper end of the left flange 91b of the left upper mounting bracket 91U to the lower end of the left flange 91b of the left lower mounting bracket 91D. The range of the left bracket auxiliary portion 92 in the width direction extends at least from an inner surface 17d of the left extension 17 in the vehicle width direction to the outer surface 17a of the left extension 17 in the vehicle width direction. Preferably, the width of the left bracket auxiliary portion 92 is substantially (basically) equal to the entire width range of the frame side mounting member 50.

A left extension portion 94 is integrally formed at the inner end of the left bracket auxiliary portion 92 in the vehicle width direction. The left extension portion 94 is a vertical plate-like member extending to the front side from the inner end of the left bracket auxiliary portion 92 in the vehicle width direction. As a result, the left extension portion 94 extends to the front side from the inner ends of the left mounting brackets 91 in the vehicle width direction. The left extension portion 94 is configured to be joined to the inner surface 17d of the left extension 17 in the vehicle width direction. In other words, the left extension side mounting member 40 is configured to be joined to the inner surface 17d of the rear end of the left extension 17 in the vehicle width direction.

Therefore, when a narrow offset collision occurs on the left side of the bumper beam 16, especially, when a collision occurs at a position outside the left and right bumper beam extensions in the vehicle width direction, the left extension portion 94 can support the left extension 17 not to fall sideways toward the inside in the vehicle width direction (toward the vehicle width center). That is, a sideways fall of the left extension 17 with respect to the left side frame 14 can be regulated. Consequently, compressive deformation of the left extension 17 caused by a collision load can be accelerated. As a result, the left bumper beam extension can sufficiently absorb collision energy. In addition, the collision load can be efficiently transferred from the left extension 17 to the left side frame 14.

As shown in FIG. 1, left and right gussets 100 are located on the outer surfaces 17a of the rear ends of the left and right extensions 17 in the vehicle width direction. The left gusset 100 will be described in detail below. The right gusset 100 has the same arrangement except that it has a bilaterally symmetrical shape with respect to the left gusset 100. The reference numerals denote the same components and a description thereof will be omitted.

As shown in FIGS. 4 and 5, the rear end of the left gusset 100 is substantially in contact with the front surface of the left extension side mounting member 40, especially, the front surface of the bracket auxiliary portion 92 (including an arrangement in which the rear end of the left gusset 100 is slightly spaced apart from the front surface). The left gusset 100 is configured to extend from the left extension side mounting member 40 to the front side, to be in contact with the outer surface 17a of the rear end of the left extension 17 in the vehicle width direction, and to be joined to the outer surface 17a. That is, the left gusset 100 is provided at the left corner of the outer surface 17a of the rear end of the left extension 17 and the left extension side mounting member 40.

When a narrow offset collision occurs in the front part of the vehicle body 11, especially, when a collision occurs at a position outside the left bumper beam extension 17 in the vehicle width direction, the left gusset 100 can directly receive a collision load. Thus, the left gusset 100 will also be referred to as a load receiving member 100 hereinafter.

The strength of the left gusset 100 is higher than that of the left extension 17. An arrangement in which the strength of the left gusset 100 is higher than that of the left extension 17 will be exemplified below. A case in which the left gusset 100 has a closed section will be explained.

In the first example, the material of the left gusset 100 is the same as that of the left extension 17. However, the plate thickness of the left gusset 100 is larger than that of the left extension 17. As a result, the left gusset 100 has high strength.

In the second example, the plate thickness of the left gusset 100 is equal to that of the left extension 17. However, the tensile strength of the material of the left gusset 100 is larger than that of the material of the left extension 17. As a result, the left gusset 100 has high strength.

In the third example, the left gusset 100 is reinforced by a reinforcing member (for example, the left reinforcing member 81 shown in FIG. 5). As a result, the left gusset 100 has high strength.

In the fourth example, a composite arrangement obtained by combining two or more of the first, second, and third examples is adopted. As a result, the left gusset 100 has high strength.

As shown in FIGS. 4 and 5, the left gusset 100 is configured to be joined to the front lower end 32a of the left front upper member 15 via the left extension side mounting member 40. A front surface 101 of the left gusset 100 inclines toward the rear side of the vehicle body while extending outward in the vehicle width direction from the left extension 17. As described above, the left gusset 100 is located at the left corner of the left extension side mounting member 40 and the outer surface 17a of the rear end of the left extension 17 in the vehicle width direction.

That is, the left gusset 100 is substantially formed into a triangular shape in a planar view. Consequently, if the collision load of a narrow offset collision acts on the left gusset 100, the collision load can be efficiently transferred from the left gusset 100 to the front lower end 32a of the left front upper member 15. In addition to the left side frame 14, the left front upper member 15 can sufficiently absorb collision energy.

As shown in FIGS. 4 and 5, the joint structure of the left gusset 100 to the left extension 17 includes a fastening structure by a bolt 102. More specifically, the left gusset 100 includes a flange 103 extending from a frontmost end 101a (the inner end in the vehicle width direction and the frontmost end 101a) of the front surface 101 to the front side. The flange 103 is configured to be overlaid on the outer surface 17a of the left extension 17 in the vehicle width direction and fastened by a fastening member such as the bolt 102. Note that the joint structure of the left gusset 100 to the left extension 17 includes the combined use of welding and the fastening structure by the fastening member such as the bolt 102.

As described above, the left extension 17 and the left gusset 100 can be firmly fastened by the bolt 102. Therefore, when an inward bending moment occurs in the left extension 17 or an outward bending moment occurs in the left gusset 100, separation of the left gusset 100 from the left extension 17 can be adequately prevented. Thus, when an outward bending moment occurs in the left gusset 100, an outward bending moment tends to occur in the left extension 17.

As shown in FIGS. 6, 10, and 11, the left gusset 100 is configured to have a closed section. A left cover plate 104 for reinforcement is provided in the left gusset 100 near a portion of the left gusset 100, which is joined to the outer surface of the rear end of the left extension 17 in the vehicle width direction.

Thus, the rigidity of the joint portion of the left gusset 100 to the rear end of the left extension 17 can be increased. Under the collision load of the narrow offset collision, the left gusset 100 resists crushing. Therefore, bending deformation or compressive deformation of the left extension 17 and left side frame 14 can be further accelerated. As a result, the left side frame 14 can sufficiently absorb the collision energy of the narrow offset collision, thereby further improving the collision energy absorption performance.

The left extension side mounting member 40 is configured to sandwich the rear end of the left extension 17 and the left gusset 100 vertically. That is, the rear end of the left extension 17 and the left gusset 100 are configured to be sandwiched and joined by the left upper mounting bracket 91U and the left lower mounting bracket 91D.

It is possible to increase the support rigidity of supporting the left extension 17 and the left gusset 100 by the left extension side mounting member 40. As a result, it is possible to suppress the vibration of the bumper beam 16 in the vertical direction, thereby improving the NV performance (noise and vibration performance) of the overall vehicle 10. In addition, if an upward or downward collision load acts on the left bumper beam 16 at the time of occurrence of a collision in the front part of the vehicle body 11, a fall in the vertical direction of the left extension 17 and left gusset 100 can be prevented.

As described above, the left gusset 100 is in contact with the outer surface 17a of the rear end of the left extension 17 in the vehicle width direction. The left mounting brackets 91, that is, the left upper mounting bracket 91U and left lower mounting bracket 91D are configured to be located on the upper surface 17b and lower surface 17c of the left extension 17. Thus, the left joint plate portion 91a of the left upper mounting bracket 91U and that of the left lower mounting bracket 91D are configured to be connected by the left gusset 100.

As described above, the outer surface 17a of the rear end of the left extension 17 in the vehicle width direction is in contact with the left gusset 100. When a narrow offset collision occurs in the bumper beam 16, especially, when a collision occurs at a position outside the left extension 17 in the vehicle width direction, the left gusset 100 can support the left extension 17 not to fall sideways toward the outside in the vehicle width direction. Thus, compressive deformation of the left extension 17 caused by a collision load can be accelerated. As a result, the left extension 17 can sufficiently absorb collision energy.

Furthermore, the left joint plate portion 91a of the left upper mounting bracket 91U and that of the left lower mounting bracket 91D are connected by the left gusset 100. Therefore, when the vehicle body 11 is viewed from the front direction, the left joint plate portions 91a located on the upper and lower sides and the left gusset 100 can substantially form a closed section. It is thus possible to further increase the support rigidity of the left extension 17 by the left side frame 14. As a result, it is possible to further suppress the vibration of the bumper beam 16 in the vertical direction, thereby further improving the NV performance of the overall vehicle 10.

As shown in FIGS. 4 and 5, the left side connecting member 37 joined to the rear surface of the left frame side mounting member 50 extends outside the position of the left extension 17 in the vehicle width direction.

The front lower end 32a of the left front upper member 15 is connected to the front end of the left front outer panel 64 by both the left side connecting member 37 and the left frame side mounting member 50. Therefore, when a narrow offset collision occurs on the left side of the front part of the vehicle body 11, the front lower end 32a of the front upper member 15 is pulled toward the front end of the left front outer panel 64, thereby implementing bending deformation. Thus, both the left front upper member 15 and its front lower end 32a can absorb collision energy, thereby increasing the energy absorption amount. When a full-lap collision occurs in the front part of the vehicle body 11, a collision load can be distributed to the left and right side frames 14 and the left and right front upper members 15. Collision energy can be sufficiently absorbed by distributing it to the side frames and the front upper members.

Furthermore, the left gusset 100 can be reinforced by the left side connecting member 37. That is, the left gusset 100 at the time of occurrence of an outward bending moment on the left side can be adequately supported by the left side connecting member 37 from the rear side. Therefore, an outward bending moment for canceling an inward bending moment can be sufficiently generated.

In addition, it is possible to distribute the collision load from the left gusset 100 to the front end of the left side frame 14 and the front lower end 32a of the left front upper member 15.

Figure 13A:
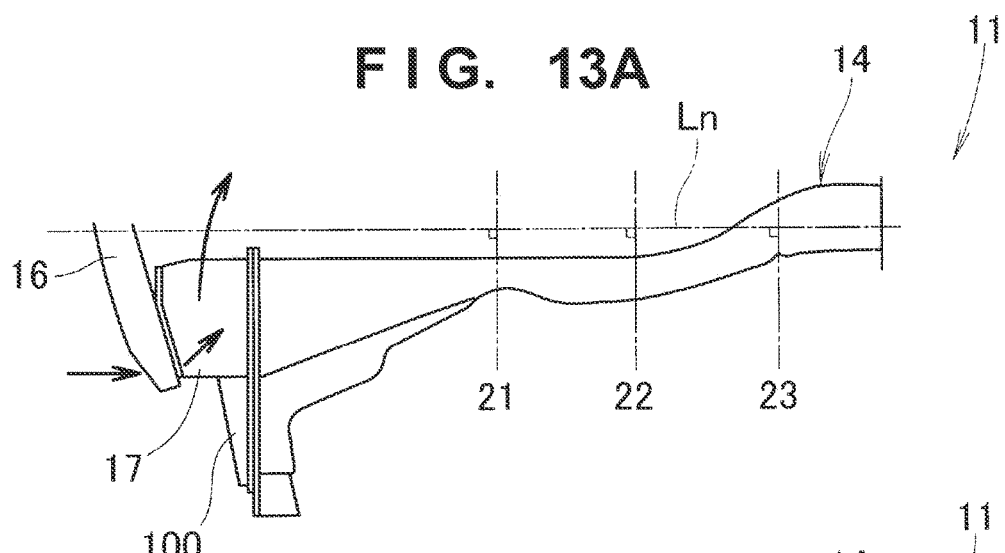
FIGS. 13A to 13C are views for explaining the function of the front part of the vehicle body shown in FIG. 1.

The function of the front part of the vehicle body when the left and right gussets 100 are included will be described next with reference to FIGS. 1 and 13A to 13C. FIG. 13A is a schematic view showing the left front part of the vehicle body 11 when viewed from above, and corresponds to FIG. 1. As shown in FIG. 13A, when a narrow offset collision occurs on the left side of the front part of the vehicle body 11, a load in the vehicle width direction from the left side (one end side) on which the collision has occurred toward the right side (the other end side), that is, the horizontal component force of a collision load acts on the bumper beam 16. At the early stage of the collision, a bending moment (inward bending moment) toward the vehicle width center side occurs in the left extension 17 and the left side frame 14 on the collision side. The left bumper beam extension undergoes compressive deformation.

Figure 13B:
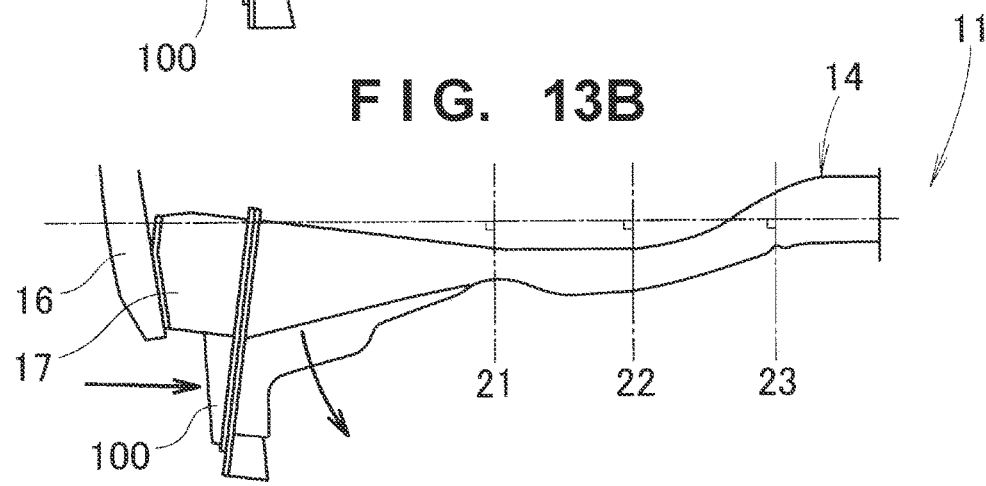

As shown in FIG. 1, however, the left and right gussets 100 are located at the left and right corners of the left and right frame side mounting members 50 and the outer surfaces 17a of the rear ends of the left and right extensions 17 in the vehicle width direction. That is, the left and right gussets 100 are located outside the left and right side frames 14 in the vehicle width direction. Therefore, as compressive deformation of the left extension 17 progresses, the collision load starts to act on the left gusset 100 at the intermediate stage of the collision, as shown in FIG. 13B.

As described above, the strength of the left gusset 100 is higher than that of the left extension 17. Thus, the left gusset 100 resists crushing. When the collision load from the front side of the vehicle body acts on the left gusset 100, a bending moment (outward bending moment) toward the outside in the vehicle width direction occurs in the left extension 17 and the left side frame 14 on the collision side. The outward bending moment acts to cancel the inward bending moment. In addition, the left and right gussets 100 are joined to the outer surfaces 17a of the rear ends of the left and right extensions 17 in the vehicle width direction. Consequently, the outward bending moment attempts to bend, via the left gusset 100, the left extension 17 and the left side frame 14 outward (leftward) in the vehicle width direction.

Figure 13C:
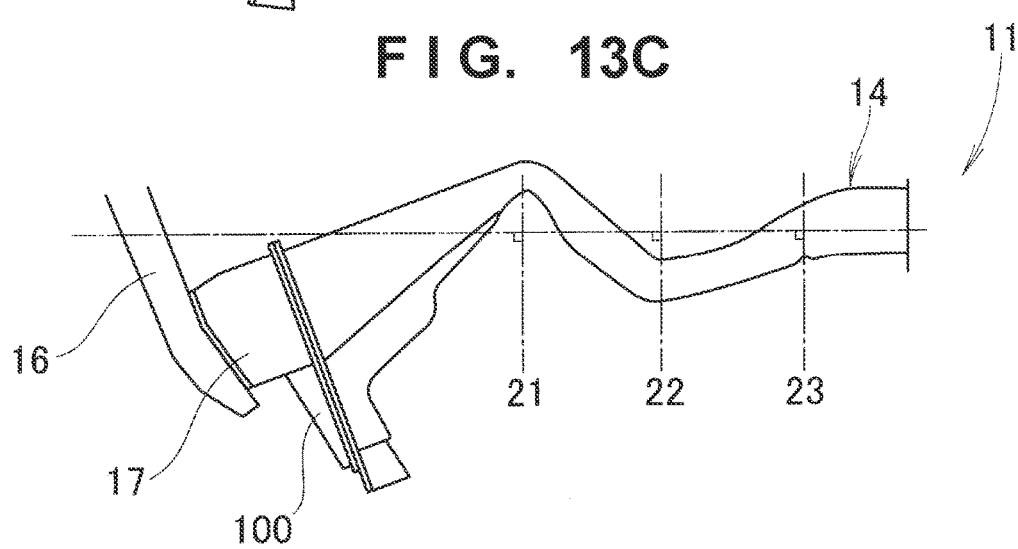

As described above, when the collision load acts on the left gusset 100, bending deformation or compressive deformation of the left extension 17 and the left side frame 14 can be accelerated, as shown in FIG. 13C. As a result, the left front side frame 14 can efficiently absorb the collision energy of the narrow offset collision.

The vehicle body front structure according to the present invention is preferably adopted for a relatively large passenger car such as an SUV or minivan.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-209656, filed Oct. 26, 2015, which is hereby incorporated by reference herein in its entirety.

What is claimed is:

1. A vehicle body front structure comprising:
a front bumper beam located at a front end of a vehicle body and extending in a vehicle width direction;
left and right bumper beam extensions extending to a rear side from two ends of the front bumper beam in a longitudinal direction; and
left and right frame side mounting members provided at front ends of left and right front side frames so as to connect rear ends of the left and right bumper beam extensions to the front ends of the left and right front side frames,
wherein the left and right front side frames are formed from left and right side inner panels on an inside in the vehicle width direction and left and right side outer panels on an outside in the vehicle width direction,
the left and right side outer panels are formed from left and right rear outer panels located in rear half portions of the left and right front side frames and left and right front outer panels located in front half portions of the left and right front side frames,
the rear half portions of the left and right front side frames are structures having a closed sectional shape and formed from the left and right side inner panels and the left and right rear outer panels,
the left and right front outer panels are formed from vertical plate-like left and right side plates, horizontal plate-like left and right upper plates extending in the vehicle width direction from upper ends of the left and right side plates, and horizontal plate-like left and right lower plates extending in the vehicle width direction from lower ends of the left and right side plates,
at least one of the set of the left and right upper plates and the set of the left and right lower plates is formed by members different from the left and right side plates, and
the left and right side plates are configured to extend from front ends of the left and right rear outer panels to a front side while inclining outward in the vehicle width direction, and to be joined to the left and right frame side mounting members.

2. The structure according to claim 1, wherein the left and right side outer panels include left and right joint portions formed by overlaying and joining the front ends of the left and right rear outer panels and front ends of the left and right front outer panels, and also include left and right fragile portions provided near the left and right joint portions.

3. The structure according to claim 2, wherein
interiors of the left and right front side frames are respectively partitioned into front portions and rear portions by left and right bulkheads provided between the left and right side inner panels and the left and right rear outer panels, and
the left and right bulkheads are located behind and near the left and right fragile portions.

4. The structure according to claim 1, wherein left and right cover plates for reinforcement are provided on surfaces of the left and right front outer panels, which face the left and right side inner panels.

5. The structure according to claim 4, wherein
the left and right upper plates extend inward in the vehicle width direction from the upper ends of the left and right side plates,
the left and right lower plates extend inward in the vehicle width direction from the lower ends of the left and right side plates, and
the left and right cover plates are provided at at least one of a set of corners between the left and right side plates and the left and right upper plates and a set of corners between the left and right side plates and the left and right lower plates.

6. The structure according to claim 1, wherein
the left and right side plates include left and right beads, formed on plate surfaces, for the side plates, and
the left and right beads for the side plates are long in a front-and-rear direction of the vehicle body.

7. The structure according to claim 1, wherein
the left and right upper plates include left and right beads, formed on plate surfaces, for the upper plates, and
the left and right beads for the upper plates are long in extension directions of the left and right side plates.

8. The structure according to claim 1, further comprising:
left and right subframe mounting brackets extending downward from the front ends of the left and right front side frames and configured to attach a front end of a subframe to lower ends, wherein the left and right subframe mounting brackets have a substantially U-shaped sectional shape open to the front side when viewed from above, open ends of the left and right subframe mounting brackets on the front side are configured to be closed by the left and right frame side mounting members and to be joined to the left and right frame side mounting members, and side plates of the left and right subframe mounting brackets on the outside in the vehicle width direction exist between side surfaces of the left and right side inner panels on the outside in the vehicle width direction and side surfaces of the left and right front outer panels on the inside in the vehicle width direction, and extend to upper ends of the left and right side inner panels.

9. The structure according to claim 1, further comprising:

left and right front upper members located outside the left and right front side frames in the vehicle width direction and extending in a front lower direction from left and right front pillars; and left and right side connecting members configured to connect front lower ends of the left and right front upper members to the front ends of the left and right front outer panels, wherein the left and right frame side mounting members extend outside positions of the left and right bumper beam extensions in the vehicle width direction, and the left and right side connecting members are configured to be jointed to the left and right frame side mounting members.

10. The structure according to claim 9, wherein the left and right frame side mounting members include left and right rear extension portions extending to the rear side from upper ends of the left and right frame side mounting members on the outside in the vehicle width direction, and the left and right rear extension portions are configured to be joined to upper surfaces of the front lower ends of the left and right front upper members.

11. The structure according to claim 1, wherein when the vehicle body is viewed from above, front ends of the left and right side plates are located on straight lines in the front-and-rear direction which pass through outer surfaces of the left and right bumper beam extensions in the vehicle width direction.

12. The structure according to claim 1, wherein the left and right upper plates include, in edge portions on the outside in the vehicle width direction, left and right three-dimensional portions undulated in plate surface directions, and the left and right three-dimensional portions are continuously undulated along the edge portions.

* * * * *